(12) United States Patent
Marggi

(10) Patent No.: US 7,849,933 B2
(45) Date of Patent: Dec. 14, 2010

(54) BIFOLD TRANSPORT LOCK

(75) Inventor: Jeff Marggi, Oregon, WI (US)

(73) Assignee: Kuhn North America, Inc., Brodhead, WI (US)

( * ) Notice: Subject to any disclaimer, the term of this patent is extended or adjusted under 35 U.S.C. 154(b) by 455 days.

(21) Appl. No.: 11/875,599

(22) Filed: Oct. 19, 2007

(65) Prior Publication Data
US 2009/0101369 A1  Apr. 23, 2009

(51) Int. Cl.
*A01B 49/00* (2006.01)
(52) U.S. Cl. .......................... 172/311; 172/456; 56/385
(58) Field of Classification Search ................ 172/311, 172/456, 439; 56/375, 377, 385, 396, 380, 56/228; 37/273, 404–408, 903; 403/321, 403/322.1, 325, 327, 328
See application file for complete search history.

(56) References Cited

U.S. PATENT DOCUMENTS

| 3,814,191 | A | * | 6/1974 | Tilbury ........................ 172/311 |
| 4,316,511 | A | * | 2/1982 | Andersen .................... 172/776 |
| 4,561,505 | A | * | 12/1985 | Williamson ................. 172/776 |
| 4,664,202 | A | * | 5/1987 | Applequist et al. .......... 172/311 |
| 4,723,787 | A | * | 2/1988 | Hadley et al. ............... 172/311 |
| 5,155,986 | A | * | 10/1992 | Kelderman .................. 56/365 |
| 5,305,590 | A | * | 4/1994 | Peeters ........................ 56/377 |
| 5,493,853 | A | * | 2/1996 | Tonutti ........................ 56/377 |
| 5,598,691 | A | * | 2/1997 | Peeters ........................ 56/377 |
| 5,685,135 | A | * | 11/1997 | Menichetti .................. 56/365 |
| 5,713,691 | A | * | 2/1998 | Solberg .................... 403/322.2 |
| 6,202,756 | B1 | * | 3/2001 | Hundeby et al. ............ 172/311 |
| 6,203,236 | B1 | * | 3/2001 | Gautier et al. ........... 403/322.1 |
| 6,336,511 | B1 | | 1/2002 | Friggstad |
| 6,691,794 | B2 | * | 2/2004 | Paluch et al. ................ 172/679 |
| 6,851,698 | B2 | * | 2/2005 | Ingles ........................ 280/509 |
| 7,100,350 | B2 | * | 9/2006 | Breneur ....................... 56/365 |
| 7,584,595 | B2 | * | 9/2009 | Marggi et al. ................ 56/385 |
| 2004/0093843 | A1 | * | 5/2004 | Tonutti ........................ 56/377 |

* cited by examiner

*Primary Examiner*—Robert E Pezzuto
*Assistant Examiner*—Matthew D Troutman
(74) *Attorney, Agent, or Firm*—Oblon, Spivak, McClelland, Maier & Neustadt, L.L.P.

(57) ABSTRACT

An apparatus includes a tongue, a pivotable beam linked to the tongue, a cylinder configured to move the pivotable beam from an operating position to a transport position, which is narrower than the operating position, and a latchable member connected to the pivotable beam. A locking assembly includes first and second dogs which can receive the latchable member. The second dog can move relative to the first dog from an open position to a closed position in response to movement of the latchable member such that movement of the latchable member out of the second dog opening is blocked by the first dog while the second dog is in the closed position. The apparatus includes a locking member that moves in response to movement of the cylinder from an unlocked to a locked position to lock the dogs in the closed position.

22 Claims, 20 Drawing Sheets

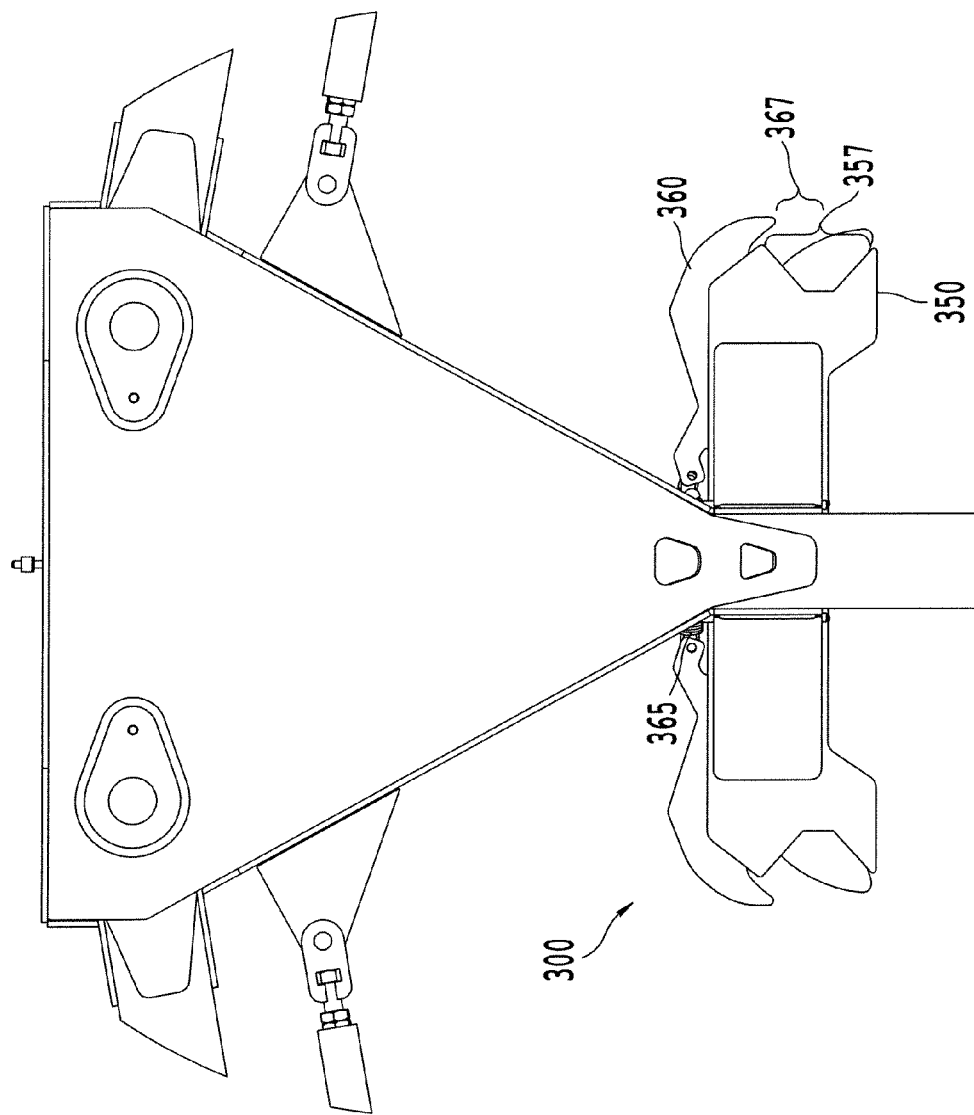

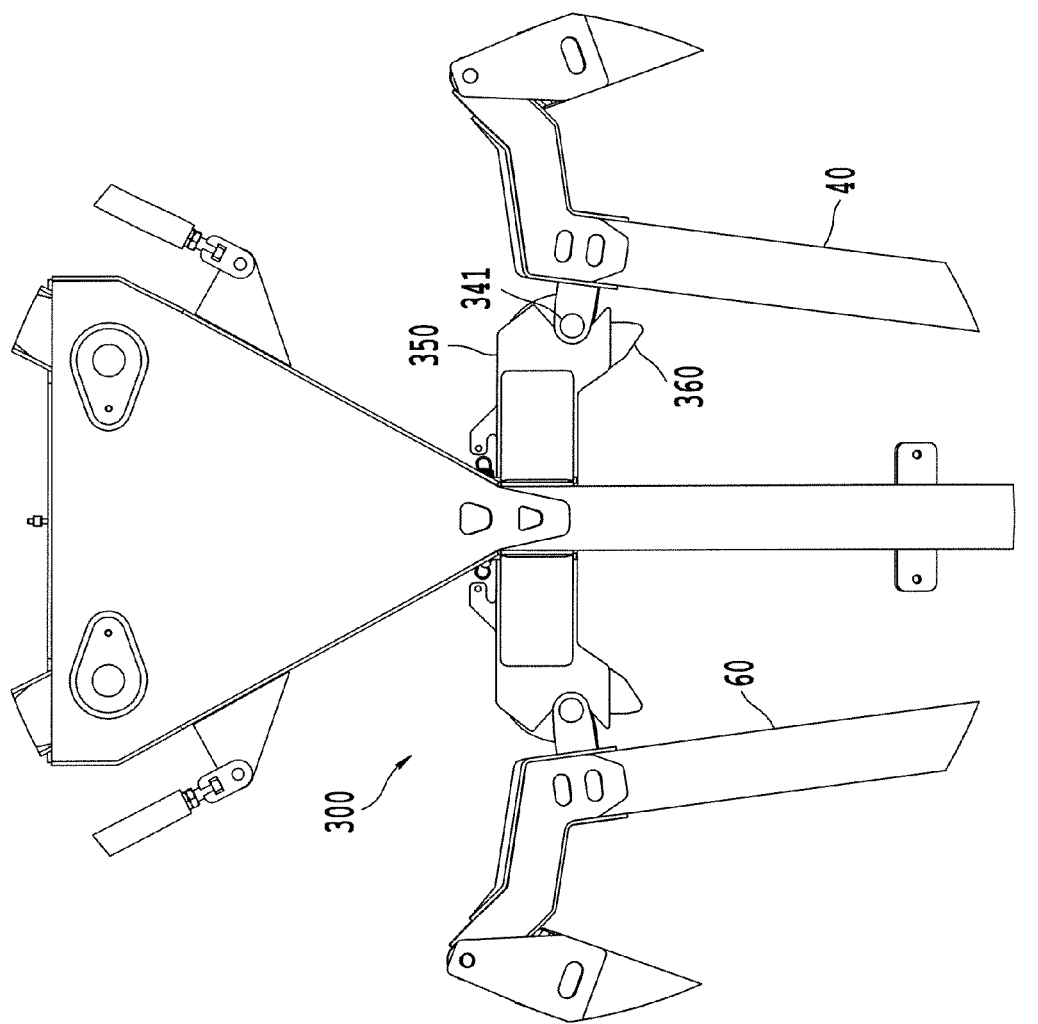

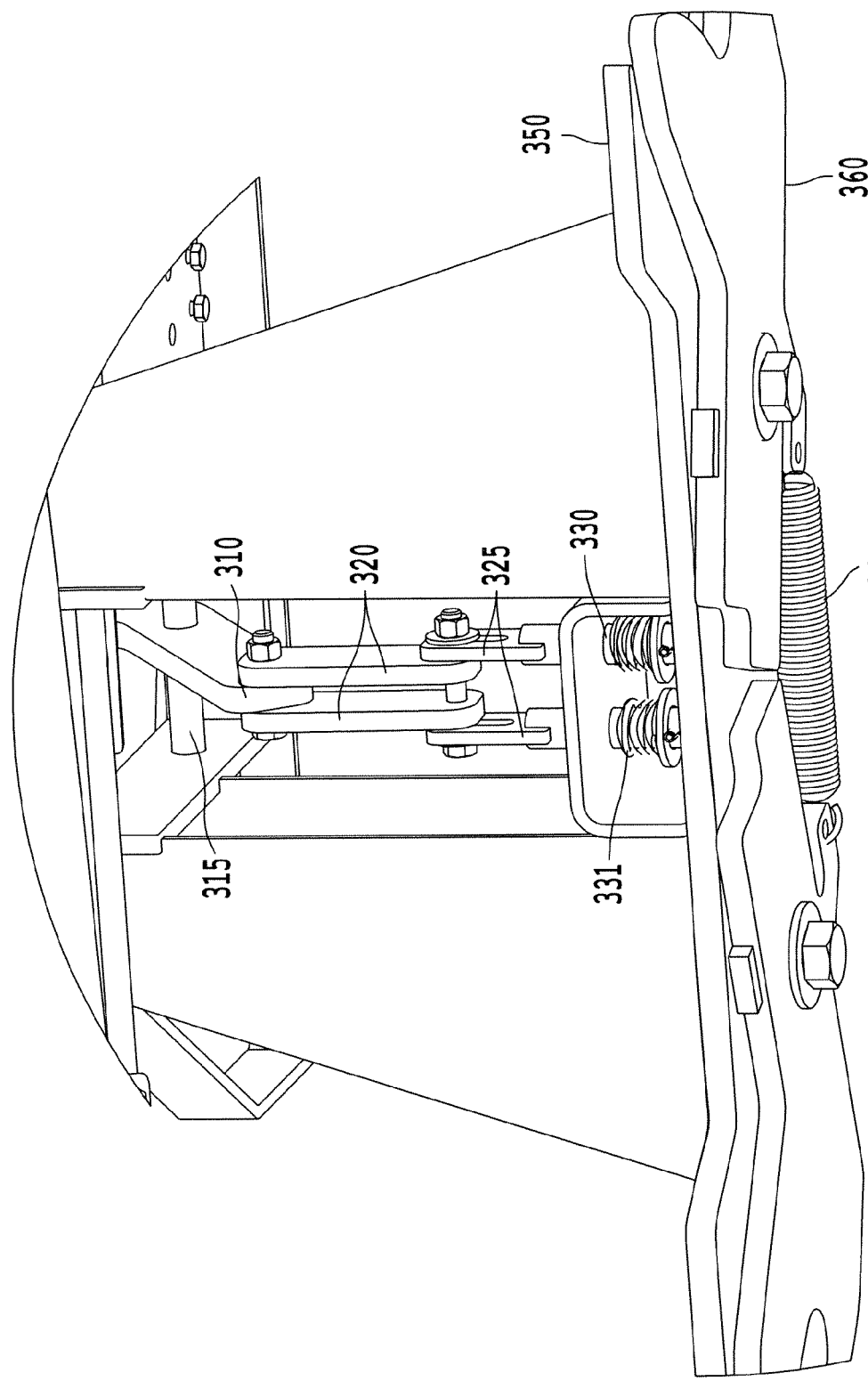

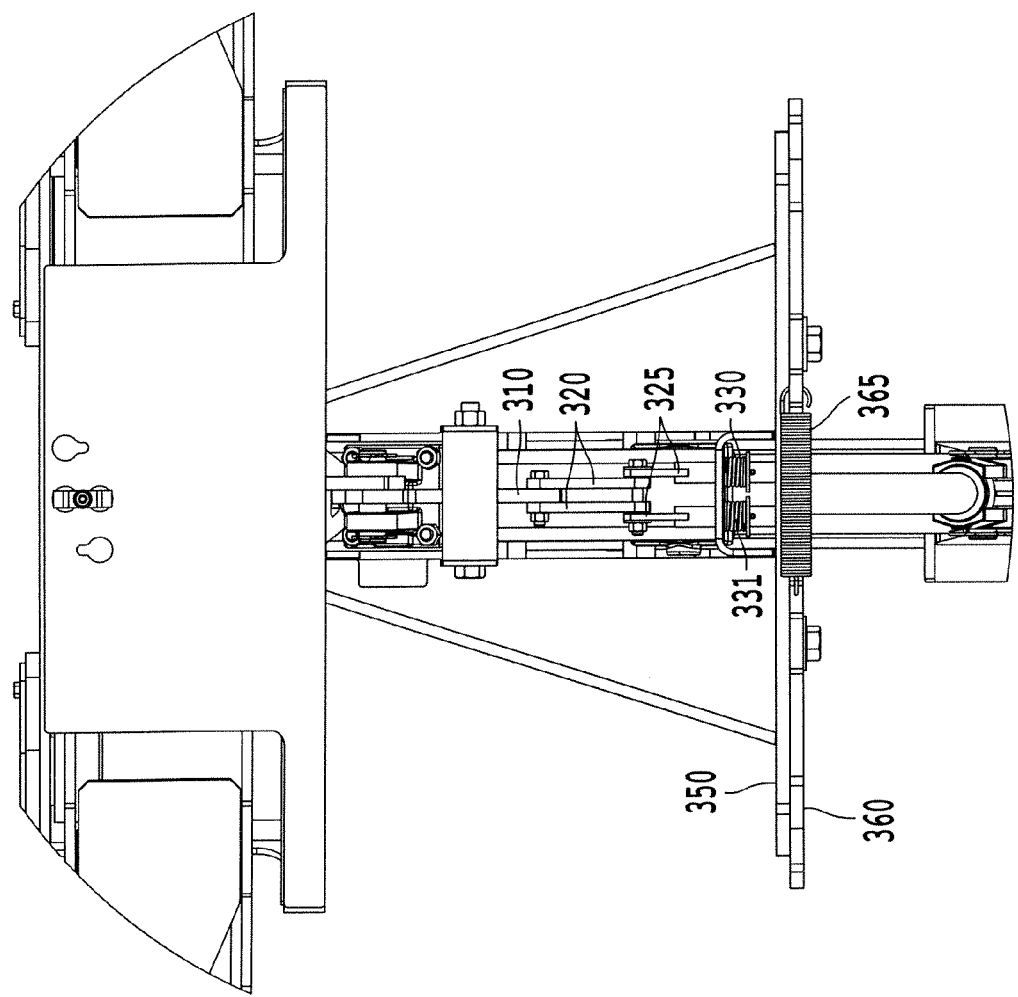

BIFOLD TRANSPORT LOCK

BACKGROUND OF THE INVENTION

1. Field of the Invention

This invention relates to an agricultural rake device. In one example, the invention relates to a locking device for a bifold or V-rake type. In an exemplary embodiment, the bifold rake is used for raking grass or hay.

2. Description of the Related Art

Agricultural rakes are used to form windrows from cut crops, such as, for example, hay, straw, corn fodder, and grasses. It is a typical agricultural process to cut these crops, rake or merge them into windrows where additional drying may occur, collect and store the crops, and subsequently feed the crops to livestock.

Modern power equipment for raking cut forage employs rotating tined wheels and particularly banks of rotating tined wheels that are moved through a field of cut forage to form windrows. These banks of wheel rakes can be quite wide to reduce both the time and number of passes required to rake a field. Because of the wide widths employed by rakes, they typically will have pivot points on each rake arm in order to fold to a narrower width for transport. Wide rakes thereby offer a potential time and cost savings to agriculture and enhance the raking process to best utilize favorable weather conditions, or to maximize the capacity utilization of the next piece of hay raking equipment.

The wide rakes require longer rake arms to support the banks of tined wheels required for efficient raking. Each rake arm includes a number of tined rake wheels which contact the ground in a operating position, and serve to rake crop material into a center windrow while being pulled through a field of cut hay or alfalfa. These long rake arms, of which there are two in so-called "bifold" rakes, can be heavy and cumbersome both in operation and in transport. While in operation, the bifold rake arms are normally spread in a "V" shape with the open end of the "V" facing forward in the direction of travel. When in a transport position, the machine must be configured to be much narrower than when the machine is in a raking, i.e., operating position. Therefore, the rake arms must pivot and/or fold in order to make the machine narrow for transport.

When the rake arms are folded for transport, it is preferred to provide a transport locking mechanism for holding the rake arms in this folded position so that they cannot unfold unexpectedly. One method is to hydrostatically lock the hydraulic cylinders responsible for moving the rake arms in and out of transport position. A hydraulic locking mechanism such as a quarter turn valve, ball valve, or pilot check valve can be used to stop the flow of hydraulic fluid to and from the cylinder. These valves are either attached to the cylinder port, or anywhere along the hydraulic hose which extends to the hydraulic source or tractor valve. This method relies on the integrity of the hydraulic system, and the rake arms can open unexpectedly upon a failure of the cylinder, hoses, or valve. In other words, if hydraulic pressure is lost, the locking mechanism may fail.

A second method of locking the rake arms for transport is to provide mechanical pins which connect the rake arms to a portion of the rake frame while in transport position. These pins can be inserted and removed manually by the operator, or spring loaded and attached to a rope or chain for operation from the cab of the tractor. This method is requires direct interaction from the operator to lock or unlock the arms. Serious damage can be caused if the operator forgets to remove the pins before trying to hydraulically operate the rake arms.

An alternative version of the mechanical pin method is to provide a dedicated bar or pipe extending in a direction transverse to the direction of travel of the rake. The pipe has holes on each end and is connected to holes on the arms by the operator via pins. This method can be difficult inasmuch as the holes in the pipe may not line up with the holes in the rake arms, and the operator is required to force the pipe into position.

SUMMARY OF THE INVENTION

Accordingly, one objective of the present invention is to provide a rake which addresses at least some of the problems associated with the above-noted devices for transport locks. Moreover, depending on the embodiment of the invention, one or more of the capabilities set forth below may be achieved.

For example, one non-limiting embodiment of the present invention can provide a rake with an automated transport lock which mechanically holds the rake arms in a transport position, then automatically releases the mechanical transport lock when the hydraulic cylinder is operated to extend the rake arms so that the arms are in an operating position.

One example of the invention includes an automatic transport lock apparatus which mechanically captures the folding rake arms when they are hydraulically folded into the transport position. The capturing mechanism may include spring-loaded hooks or dogs which slide over latchable members such as metal pins on the positioning arms, rake arms, or other folding arms as the rake arms are being closed for transport. The hooks or dogs then snap into place when the rake arms reach the closed position, and mechanically prevent the rake arms from opening. When the rake arms are to be opened, a hydraulic cylinder operated from the tractor forces the hooks open, releasing the rake arms for opening. In one embodiment, this cylinder is the same as the cylinder that opens the arms. Thus, no extra hydraulic cylinder is needed, yet the arms are locked in place mechanically, i.e., with pins preventing movement, rather than with mere hydraulic pressure. The use of this type of mechanism provides a positive means of locking the rake arms in transport position while allowing their automatic release whenever the operator hydraulically opens the rake arms.

In one example of the invention, the operator does not need to leave the tractor cab to lock or unlock the arms when changing between the transport and operating positions of the machine. Therefore, the operator does not need to remember to pin (lock) or unpin (unlock) the transport mechanism before or after transport, and the possibility of damage to the arms or hydraulic system is reduced. Another potential advantage is that there is less chance of accidental opening of rake arms due to hydraulic failure or operator error or omission.

Additionally, the number of ropes, chains, other mechanical operating means can be reduced inasmuch as the system may be configured to operate automatically upon actuation of the same cylinder or cylinders that move the arms themselves.

BRIEF DESCRIPTION OF THE DRAWINGS

These and other advantages of the invention will become more apparent and more readily appreciated from the following detailed description of the exemplary embodiments of the invention taken in conjunction with the accompanying drawings where:

FIG. 9a is a more detailed top view of the locking device shown in FIG. 8 with the locking device shown in the open position;

FIG. 9b is a more detailed top view of the locking device of FIG. 9a, but with the rake in the transport position, i.e., the rake arms and locking device are in a closed position;

FIG. 10a is a perspective view of the device shown in FIG. 10 in the open position;

FIG. 13a is rear view of a locking device in the open position; and

DETAILED DESCRIPTION OF THE PREFERRED EMBODIMENTS

Figure 1:
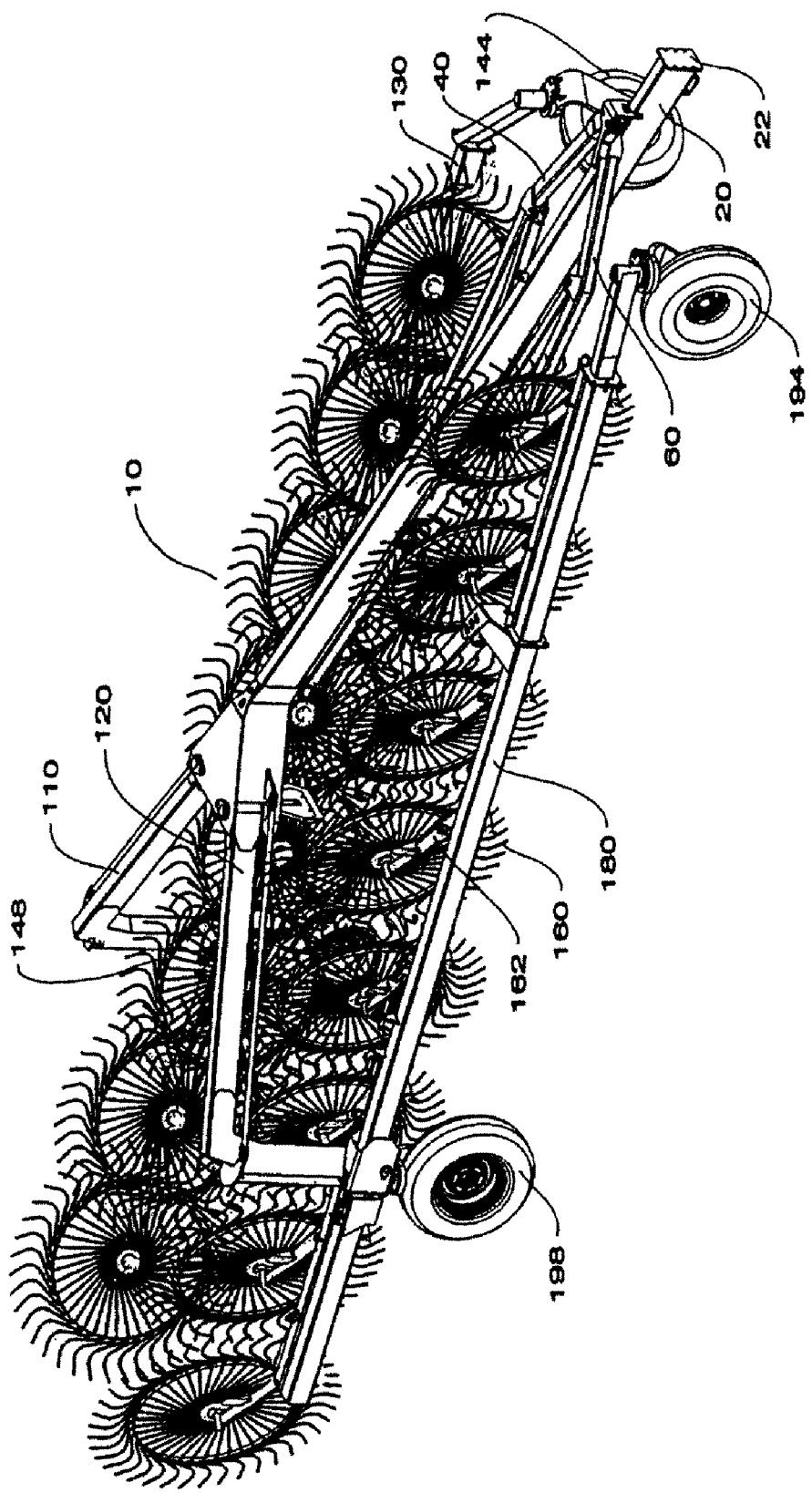
FIG. 1 is an isometric view of a bifold rake in an operating position, but without a locking device shown.
Figure 8:
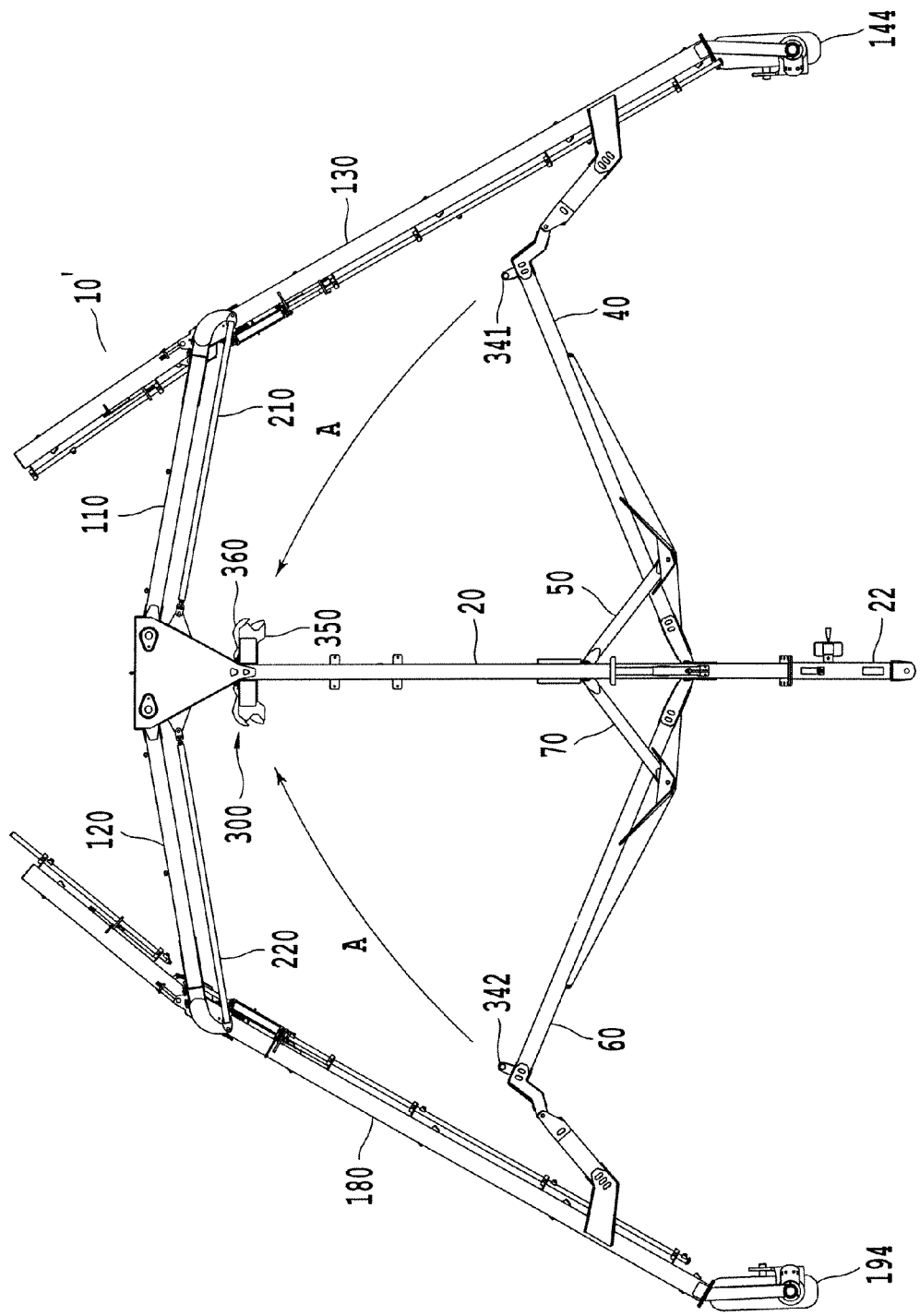
FIG. 8 is a top view of an embodiment of a bifold rake in an operating position or "open" position and in which a locking device is shown.

With reference to FIG. 1, one non-limiting embodiment of a rake apparatus is generally designated by the reference number 10. FIG. 8 shows a similar rake apparatus 10', but with a specialized locking device 300 included.

The rake apparatus 10 includes a tongue assembly 20, which includes a hitch 22 at a forward end (note that the hitch need not be connected at the very end of the tongue assembly, but can be positioned somewhat toward the middle). The rake apparatus is configured to be pulled forward by connection with the hitch 22. As viewed facing forward, toward the direction of travel, a left rake arm assembly 130 and a right rake arm assembly 180 each include a plurality of tined rake wheels 160 attached to the rake arm assemblies 130 and 180 by a plurality of rake wheel arms 162. The left rake arm assembly 130 also includes rake arm wheels 144 and 148, and the right rake arm assembly 180 includes rake arm wheels 194 and 198. The rake arm assemblies 130 and 180 are attached to the tongue assembly 20 at the front by a left front rake arm positioner 40 and a right front rake arm positioner 60. The rake arm assemblies 130 and 180 are attached to the tongue assembly 20 at the rear by a left rear rake arm positioner 110 and a right rear rake arm positioner 120.

Figure 2:
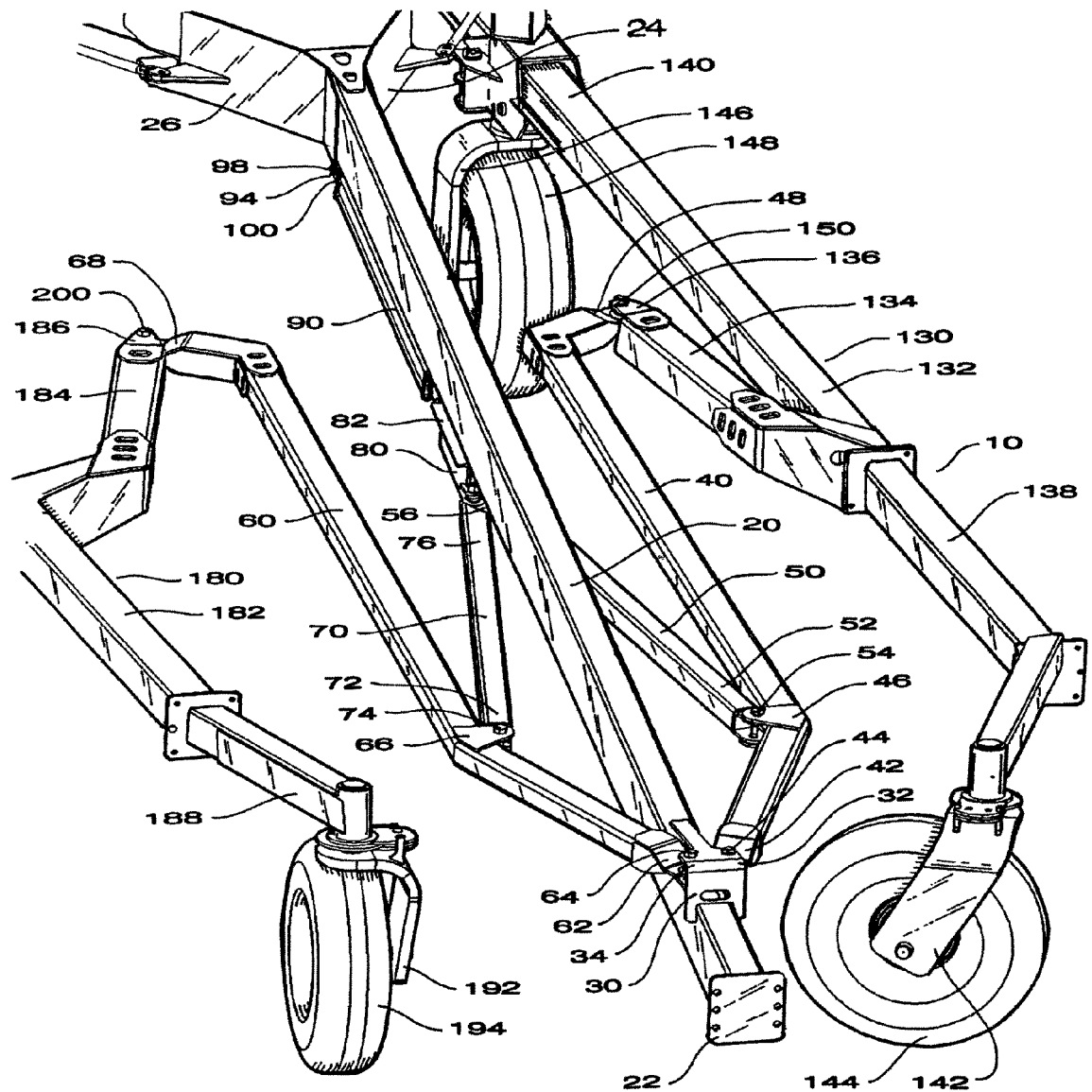
FIG. 2 is an isometric view of a bifold rake shown in FIG. 1 in a transport position.
Figure 3:
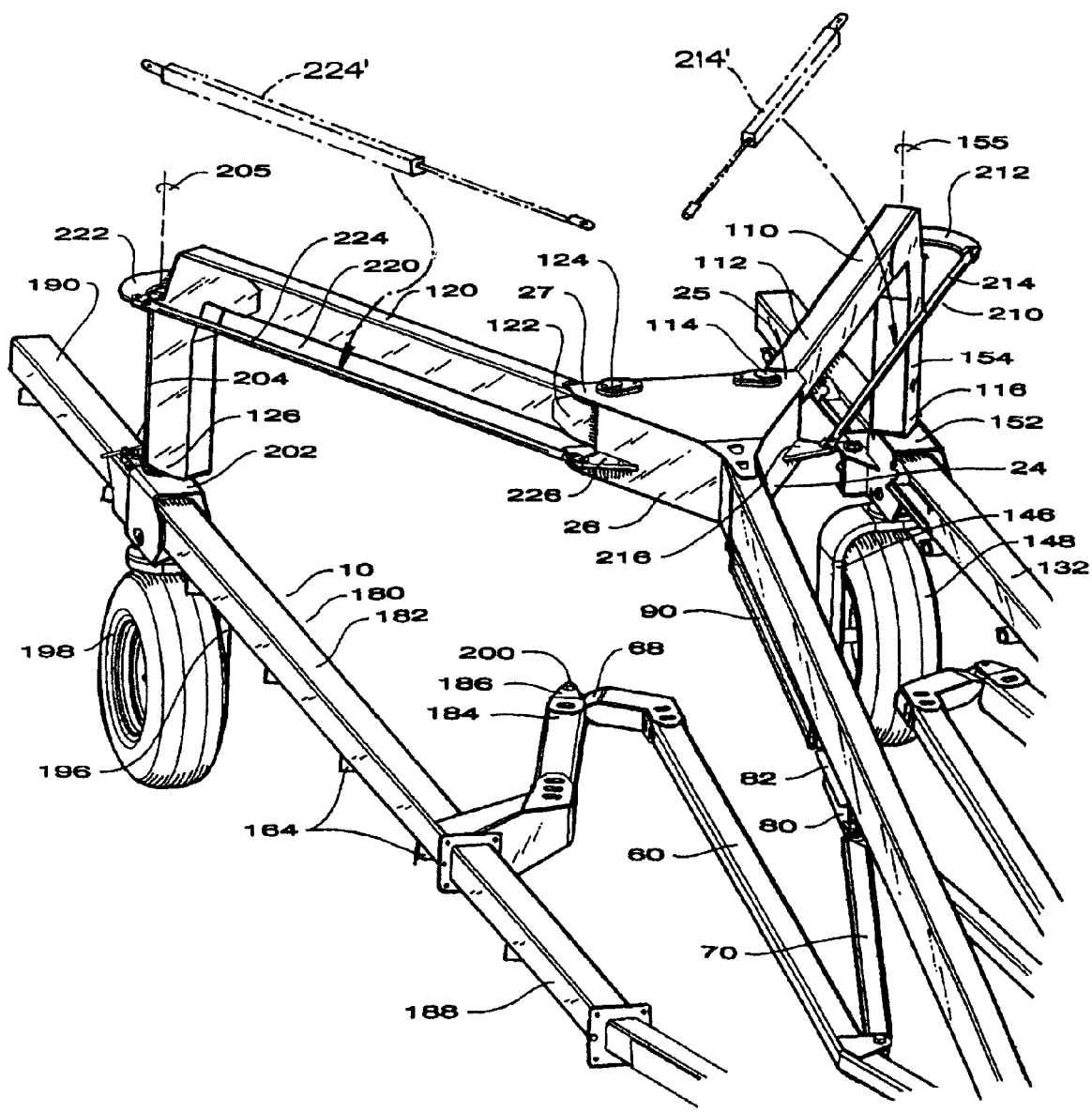
FIG. 3 is an isometric view of the rear portion of a bifold rake shown in FIG. 1.

With reference to FIGS. 2 and 3, the rake apparatus 10 includes a tongue assembly 20, which typically includes a hitch 22 at the forward end, and a left wing 24 and a right wing 26 at the rear end. The left wing 24 includes a left wing pivot 25, and the right wing 26 includes a right wing pivot 27. Adjacent to the hitch 22 is a tongue pivot assembly 30 further including a left tongue pivot 32 and a right tongue pivot 34.

A left front rake arm positioner 40 includes a left front positioner pivot 42 which is attached to the left tongue pivot 32 by a left tongue pivot pin 44. The left front rake arm positioner 40 also includes a left middle positioner pivot 46 and a left rear positioner pivot 48.

A left pusharm 50 is located adjacent to the left front rake arm positioner 40, and includes a left pusharm pivot 52 which connects the left pusharm 50 with the left front rake arm positioner 40 at the left middle positioner pivot 46. A left pusharm pin 54 connects the left pusharm pivot 52 to the left middle positioner pivot 46. The left pusharm 50 also includes a left sled pusharm pivot 56 at the opposite end from the left pusharm pivot 52. One non-limiting variation of this configuration replaces the left pusharm 50 with a hydraulic cylinder, attaching it to the left middle positioner pivot 46 on one end, and to a point attached to the tongue assembly 20 on the opposite end. This variation allows movement of the rake arm positioner 40 independently from the right side components.

A right front rake arm positioner 60 includes a right front positioner pivot 62 which is attached to the right tongue pivot 34 by a right tongue pivot pin 64. The right front rake arm positioner 60 also includes a right middle positioner pivot 66 and a right rear positioner pivot 68.

Figure 6:
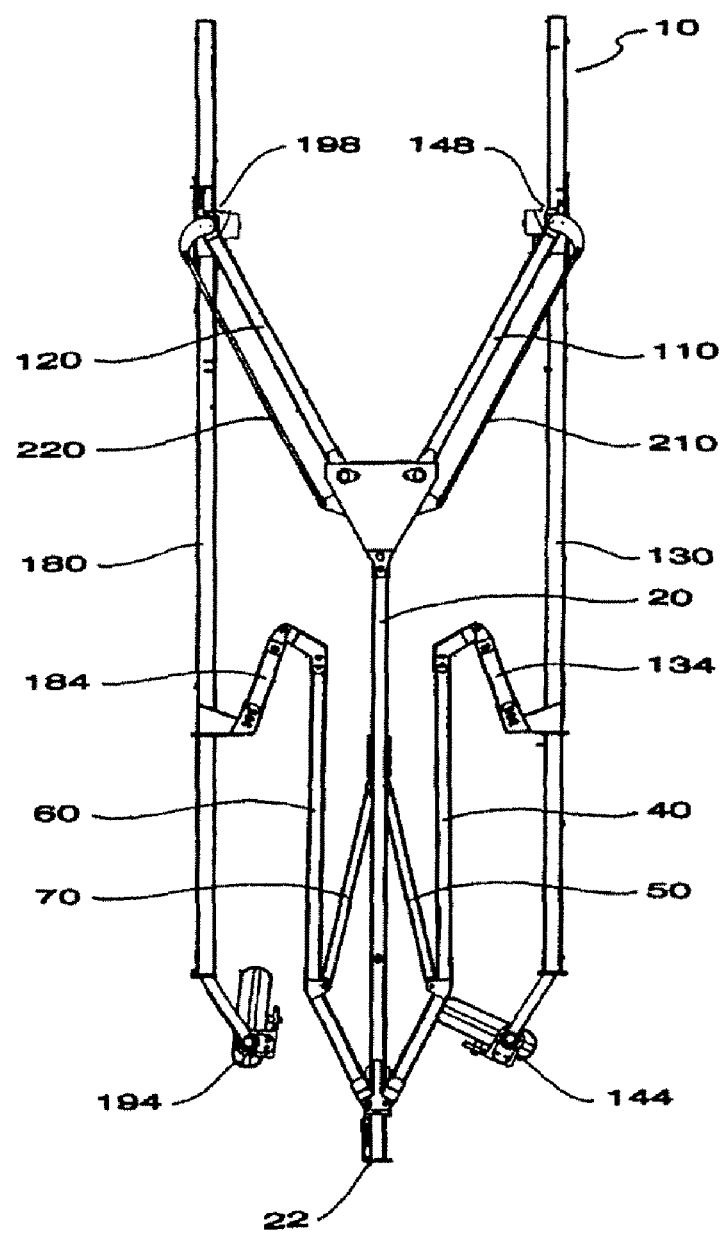
FIG. 6 is a top view of a bifold rake shown in FIG. 1 in a transport position.

A right pusharm 70 is located adjacent to the right front rake arm positioner 60, and includes a right pusharm pivot 72 which connects the right pusharm 70 with the right front rake arm positioner 60 at the right middle positioner pivot 66. A right pusharm pin 74 connects the right pusharm pivot 72 to the right middle positioner pivot 66. The right pusharm 70 also includes a right sled pusharm pivot 76 at the opposite end from the right pusharm pivot 72. One non-limiting variation of this configuration is to replace the right pusharm 70 with a hydraulic cylinder 70', attaching it to the right middle positioner pivot 66 on one end, and to a rigid point attached to the tongue assembly 20 on the opposite end. One example of the hydraulic cylinder 70' used to replace the pusharm 70 is shown in FIG. 6. This variation would then allow movement of the rake arm positioner 60 independently of the left side components.

Figure 4:
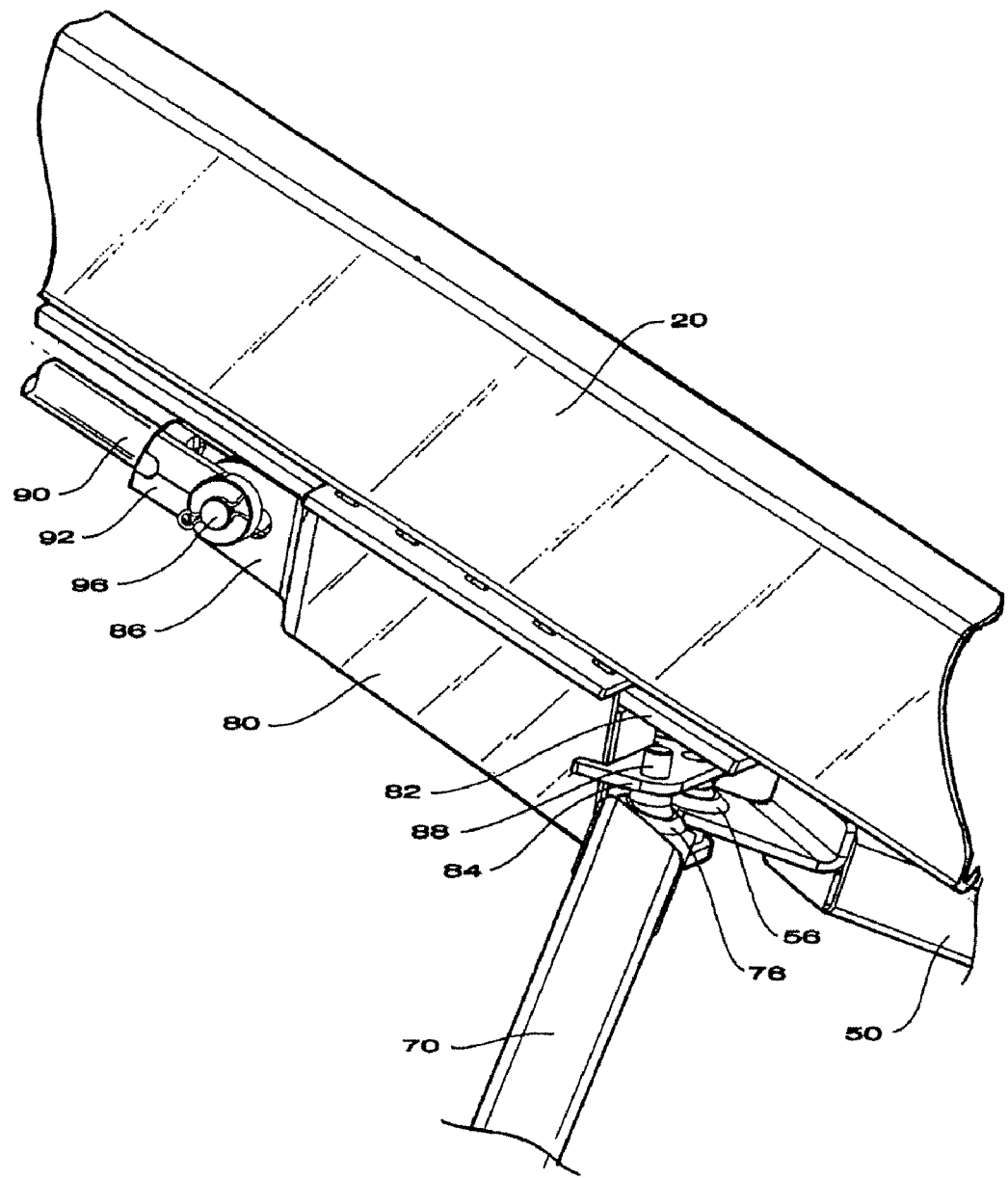
FIG. 4 is an isometric view of a sled assembly according to one non-limiting embodiment of the invention.

A sled assembly 80 is typically slidably attached underneath the tongue assembly 20 by a sled guide 82. In other embodiments, the sled guide may be above or wrapped around the tongue assembly 20. The sled guide 82 is preferably a "T" shaped rail, but could alternatively be other structural shapes which are capable of retaining the sled assembly 80 while allowing it to slide easily along the sled guide 82. As shown in FIG. 4, the sled assembly 80 includes a sled pivot 84 at the front end and a sled cylinder mount 86 at the rear end. At least one sled pivot pin 88 attaches the sled pivot 84 to the left sled pusharm pivot 56 and the right sled pusharm pivot 76. A sled cylinder 90 is typically located behind the sled assembly 80, and the sled cylinder 90 includes a front cylinder clevis 92 and a rear cylinder clevis 94. The front cylinder clevis 92 is attached to the sled cylinder mount 86 by a front cylinder pin 96. The rear cylinder clevis 94 is attached to a tongue cylinder mount 98 by a rear cylinder pin 100. The tongue cylinder mount 98 is typically rigidly attached underneath the tongue assembly 20 and just behind the sled cylinder 90. In another non-limiting embodiment, the cylinder 90 is located in front of the sled assembly 80 and pulls the ends of the right and left push arms 70, 50 forward toward the hitch 22 to move the rake arm assemblies 180 and 130 into an operating position. Whether located in front of the sled assembly 80 or behind it, the cylinder 90 may be positioned above, beside, or below the tongue assembly 20.

As shown in FIG. 3, at the rear end of the tongue assembly 20 adjacent to the left wing 24 is a left rear rake arm positioner 110. The left rear rake arm positioner 110 includes a left inner positioner pivot 112, which is pivotally attached to the left wing pivot 25 by a left wing pin 114. The left rear rake arm positioner 110 also includes a left outer positioner pivot 116 which is located at the opposite end from the left inner positioner pivot 112.

At the rear end of the tongue assembly 20 adjacent to the right wing 26 is a right rear rake arm positioner 120. The right rear rake arm positioner 120 includes a right inner positioner pivot 122, which is pivotally attached to the right wing pivot 27 by a right wing pin 124. The right rear rake arm positioner 120 also includes a right outer positioner pivot 126 which is located at the opposite end from the right inner positioner pivot 122.

As shown in FIG. 2, a left rake arm assembly 130 includes a left rake arm 132. A left rake arm extension 134 is rigidly attached to the left rake arm 132 and includes a left rake arm extension pivot 136. A left extension pin 150 connects the left rake arm extension pivot 136 to the left rear positioner pivot 48. The left rake arm 132 also includes a left rake arm front 138 and a left rake arm rear 140. At least one left rake arm wheel mount assembly 142 is mounted on the left rake arm 132, and includes a left rake arm wheel 144. In some applications, the left rake arm wheel mount assembly 142 is located adjacent the left rake arm front 138, and a further left rake arm wheel mount assembly 146 and further left rake arm wheel 148 are located adjacent the left rake arm rear 140.

As shown in FIG. 3, a left rear rake arm pivot 152 is attached to the left rake arm 132 and is connected to the left outer positioner pivot 116 by a left vertical spindle 154. The left vertical spindle 154 includes an axis of rotation 155 which is relatively vertical. The top of the left vertical spindle 154 is attached to a left bell crank assembly 210, which includes a left steering arm 212, a left pushrod 214, and a left pushrod mount 216. The bottom of the left vertical spindle 154 is attached to the further left rake arm wheel mount assembly 146. The function of the left bell crank assembly 210 is to retain the position of the further left rake arm wheel 148 in parallel alignment to the tongue assembly 20 during folding and unfolding of the rake arm assemblies 130 and 180. Alternatively, the bell crank assembly 210 can be omitted, and the left rake arm wheel can be mounted on a caster (not shown). The same arrangement may be made for the further right rake arm wheel 198. In an alternate embodiment, the left pushrod 214 is replaced with a hydraulic cylinder, and the left rake arm wheel mount assembly 146 can be controlled independently of the left rake arm positioner 110, which then helps to open and close the left rake arm assembly 130. In another non-limiting embodiment, the cylinder 90 is not used, and two cylinders 214' and 224' are used in place of the pushrods 214 and 224. An example of a hydraulic cylinder used in this manner is shown in FIGS. 3 and 6. In this embodiment, forward motion of the rake apparatus 10 can be used to cause the further right and left rake arm wheels 198, 148 to pull the right and left rake arm assemblies 180, 130 away from the tongue assembly 20 and into an operating position.

A right rake arm assembly 180 includes a right rake arm 182. A right rake arm extension 184 is rigidly attached to the right rake arm 182, and includes a right rake arm extension pivot 186. A right extension pin 200 connects the right rake arm extension pivot 186 to the right rear positioner pivot 68. The right rake arm 182 also includes a right rake arm front 188 and a right rake arm rear 190. At least one right rake arm wheel mount assembly 192 is mounted on the right rake arm 182, and includes a right rake arm wheel 194. In some applications, the right rake arm wheel mount assembly 192 is located adjacent the right rake arm front 188, and a further right rake arm wheel mount assembly 196 and further right rake arm wheel 198 are located adjacent the right rake arm rear 190.

A right rear rake arm pivot 202 is attached to the right rake arm 182, and is connected to the right outer positioner pivot 126 by a right vertical spindle 204. The right vertical spindle 204 includes an axis of rotation 205 which is relatively vertical. The top of the right vertical spindle 204 is attached to a right bell crank assembly 220, which includes a right steering arm 222, a right pushrod 224, and a right pushrod mount 226. The bottom of the right vertical spindle 204 is attached to the further right rake arm wheel mount assembly 196. The function of the right bell crank assembly 220 is to retain the position of the further right rake arm wheel 198 in parallel alignment to the tongue assembly 20 during folding and unfolding of the rake arm assemblies 130 and 180. In an alternate embodiment, the right pushrod 224 is replaced with a hydraulic cylinder, and the right rake arm wheel mount assembly 196 can be controlled independently of the right rake arm positioner 120. This alternate embodiment enhances the ability to open and close the right rake arm assembly 180.

A plurality of tined rake wheels 160 (shown in FIG. 1) are attached to the rake arm assemblies 130 and 180 by a plurality of tined rake wheels arms 162, which pivot on tined rake wheel mounts 164.

FIG. 4 shows a portion of the tongue assembly 20. A sled assembly 80 is slidably attached underneath the tongue by a sled guide 82. The sled guide 82 is preferably a "T" shaped rail, but could alternatively be other structural shapes which are capable of retaining the sled assembly 80 while allowing it to slide or roll easily along the sled guide 82. The sled assembly 80 typically includes a sled pivot 84 at the front end and a sled cylinder mount 86 at the rear end. The sled pivot 84 can include one or more sled pivot pins 88. At least one sled pivot pin 88 attaches the sled pivot 84 to the left sled pusharm pivot 56 of the left pusharm 50 and to the right sled pusharm pivot 76 of the right pusharm 70. A sled cylinder 90 is located behind the sled assembly 80, and the sled cylinder 90 includes a front cylinder clevis 92. The front cylinder clevis 92 is attached to the sled cylinder mount 86 by a front cylinder pin 96.

Figure 5:
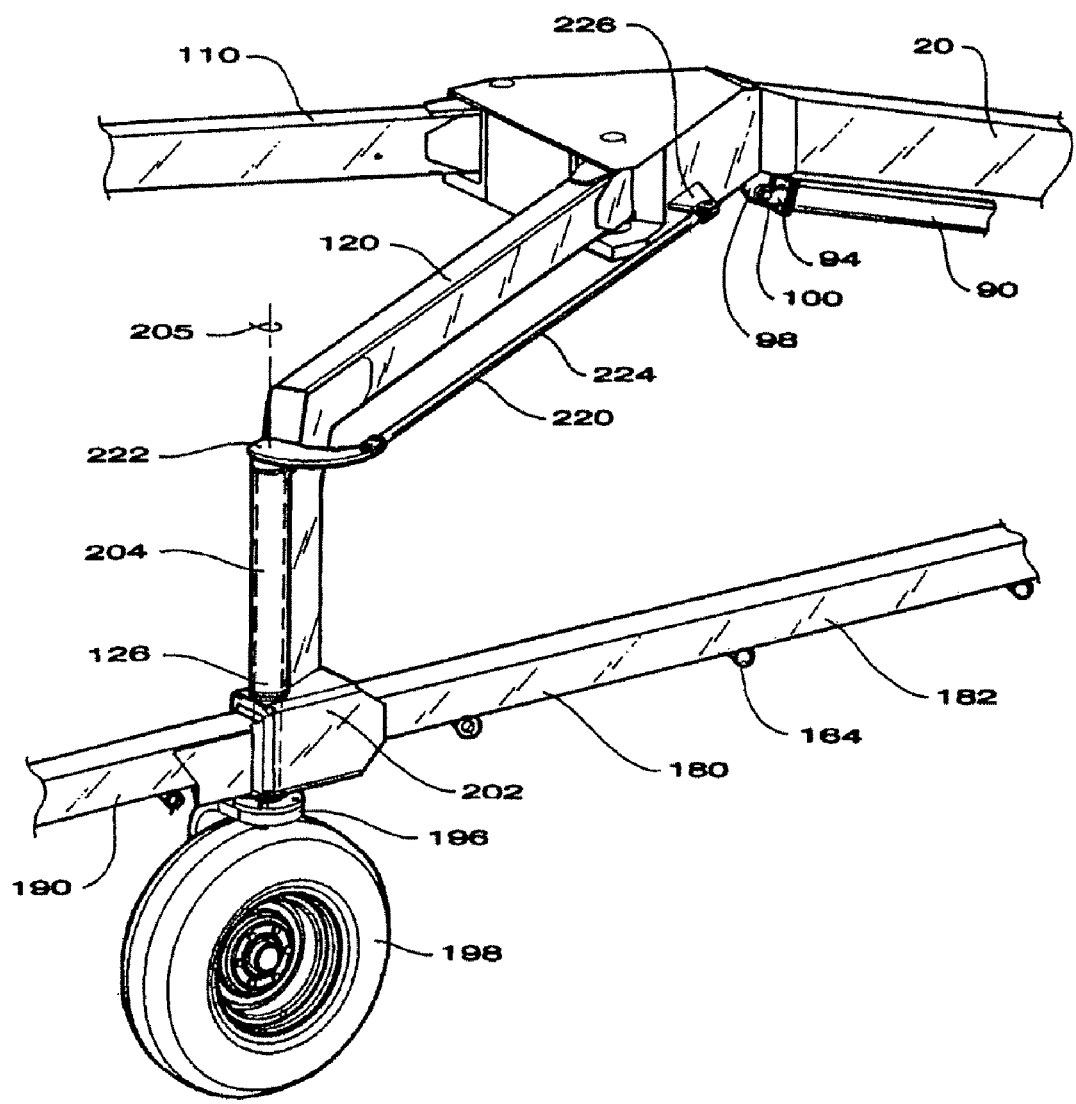
FIG. 5 is an isometric view of a rear rake arm positioner according to one non-limiting embodiment of the invention.

FIG. 5 shows a portion of the tongue assembly 20, including a left rake arm positioner 110 and a right rake arm positioner 120. A tongue cylinder mount 98 is rigidly attached underneath the tongue assembly 20 behind the sled cylinder 90. The rear cylinder clevis 94 is attached to a tongue cylinder mount 98 by a rear cylinder pin 100. Other configurations are possible. For example, the cylinder 90 can be attached above the tongue assembly 20 or beside it.

A right bell crank assembly 220 is shown which is used to position the further right rake arm wheel 198 in parallel alignment to the tongue assembly 20 during folding and unfolding of the right rake arm assembly 180. It is understood that the left bell crank assembly 210 is typically a mirror image arrangement on the opposite side. A right vertical spindle 204 is shown with an axis of rotation 205 which is relatively vertical. The right vertical spindle 204 passes through the right outer positioner pivot 126 and the right rake arm pivot 202 before being attached at the base to the further right rake arm wheel mount assembly 196 and further right rake arm wheel 198. The right vertical spindle 204 is attached at the top to a right steering arm 222, which then connects to a right pushrod 224. The right pushrod 224 is attached to the right pushrod mount 226.

Figure 7:
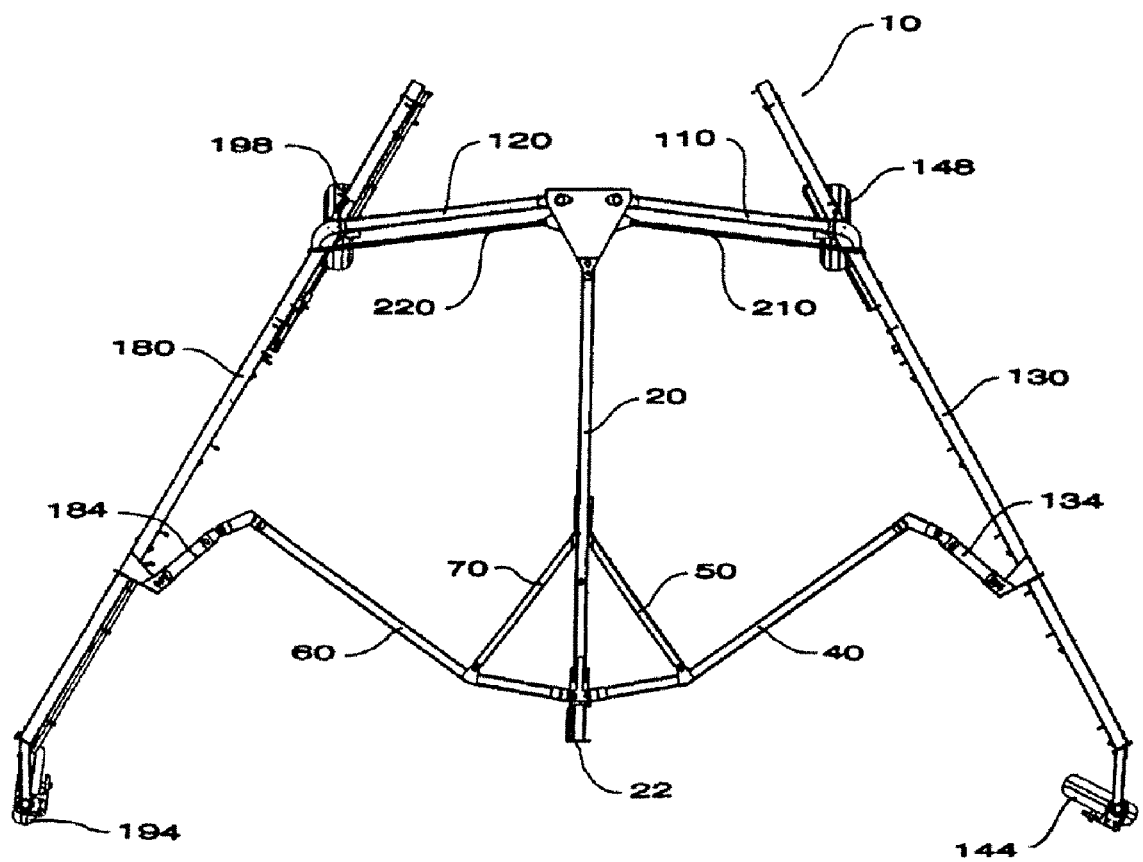
FIG. 7 is a top view of a bifold rake shown in FIG. 1 in an operating position.

With reference to FIGS. 6 and 7, the rake apparatus 10 includes a hitch 22 attached to the tongue assembly 20. A left front rake arm positioner 40 and a right front rake arm positioner 60 are pivotally connected to the front end of the tongue assembly 20. A left rear rake arm positioner 110 and a right rear rake arm positioner 120 are pivotally connected to the rear end of the tongue assembly 20. The front rake arm positioners 40 and 60 are pivotally connected to a left rake arm extension 134 and a right rake arm extension 184, which are rigidly connected to a left rake arm assembly 130 and a right rake arm assembly 180 respectively. The rear rake arm positioners 110 and 120 are also pivotally connected to the rake arm assemblies 130 and 180. A left rake arm wheel 144 and a further left rake arm wheel 148 are attached to the left rake arm assembly 130. A right rake arm wheel 194 and further right rake arm wheel are attached to the right rake arm assembly 180. The rake apparatus 10 is made to fold and unfold using a left pusharm 50 and a right pusharm 70, which are pivotally connected to the front rake arm positioners 40 and 60. The further rake arm wheels 148 and 198 are maintained in parallel alignment to the tongue assembly 20 using a left bellcrank assembly 210 and a right bellcrank assembly 220 attached between the tongue assembly 20 and the rear rake arm positioners 110 and 120.

As shown in FIGS. 6 and 7, the rake apparatus 10 is narrower when the rake arm assemblies 130, 180 are in the transport position (FIG. 6) than when the rake arm assemblies are in the operating position (FIG. 7).

A second embodiment of the rake apparatus 10 is shown by 10' in FIG. 8. In this exemplary embodiment, the rake apparatus 10' includes a locking assembly 300. The locking assembly 300 is typically attached to the tongue assembly 20 and is configured to receive latchable members 341 and 342, which are preferably attached to the front rake arm positioners 40 and 60, respectively. In the embodiment of FIG. 8, the locking assembly 300 is connected at a lower side of the tongue assembly 20. It is preferable to place the locking assembly 300 near the central axis of the rake apparatus 10' so that the sled cylinder 90, which is used to actuate the locking assembly 300, is located near the locking assembly 300 as will be discussed below.

As the components on each side of the tongue assembly 20 are typically substantially symmetrical to each other relative to a vertical plane passing through the tongue assembly 20, the following description will address the structure of the locking assembly with respect to one side of the rake apparatus 10'.

As shown in FIGS. 8, 9a, and 9b, the locking assembly 300 includes first and second hooks or dogs 350, 360 disposed on tongue assembly 20. The first dog 350 includes a first dog opening 357, which is shaped to be able to receive the latchable member 341. The second dog 360 includes a second dog opening 367, which is also shaped to be able to receive the latchable member 341. When a pivotable beam such as the front rake arm positioner 40 moves along an arc 'A' (shown in FIG. 8) from the operational position to the transport position, the latchable member 341 moves into both of the dog openings 357 and 367. As the latchable member 341 moves into the dog openings 357 and 367, one or both of the first and second dogs moves in response to movement of the latchable member 341 to close off the dog openings 357 and 367 so that the latchable member 341 does not have a free path for exiting either of the dog openings 357 and 367.

In one embodiment, only one of the dogs moves relative to the tongue assembly 20 in response to pressure from the latchable member 341, and one of the dogs is rigidly attached to the tongue assembly 20. One advantage of this arrangement is simplicity in that the low number of moving parts makes the locking assembly 300 easier to manufacture.

In another embodiment, both the first dog 350 and second dog 360 move in response to pressure from the latchable member 341. One advantage of this arrangement is that the dog openings can be made wider because the increased stroke or arc through which the dogs move, when moved together in different directions, makes it possible to close a wider opening than when one of the dogs is stationary with respect to the tongue assembly 20.

While the latchable member 341 can be attached to other movable arms of the rake apparatus 10', attachment of the latchable members to the front rake arm positioners 40 and 60 is beneficial inasmuch as these members are typically configured to pivot along an arc with one end at a location on or very near the tongue assembly 20. Additionally, the front rake arm positioners 40 and 60 are often longer than other pivotable beams (arms) in the rake apparatus, and therefore, provide an advantage in terms of mechanical leverage for the locking assembly 300.

As discussed above, the front rake arm positioner 40 moves as the sled assembly 80 moves. The sled assembly 80 moves in response to movement of the sled cylinder 90. Therefore, movement of the sled cylinder ultimately results in movement of the front rake arm positioner 40 along an arc that places the latchable member 341 within the first and second dog openings 357 and 367. As the sled cylinder 90 continues to extend, the latchable member 341 pushes into the first and second dog openings 357 and 367 and causes at least one of the dog openings 357 and 367 to move from an open position, through which the latchable member 341 can pass, to a closed position, through which the latchable member 341 cannot pass without further movement of one of the first and second dogs 350, 360 and its corresponding dog opening 357, 367.

Figure 12A:
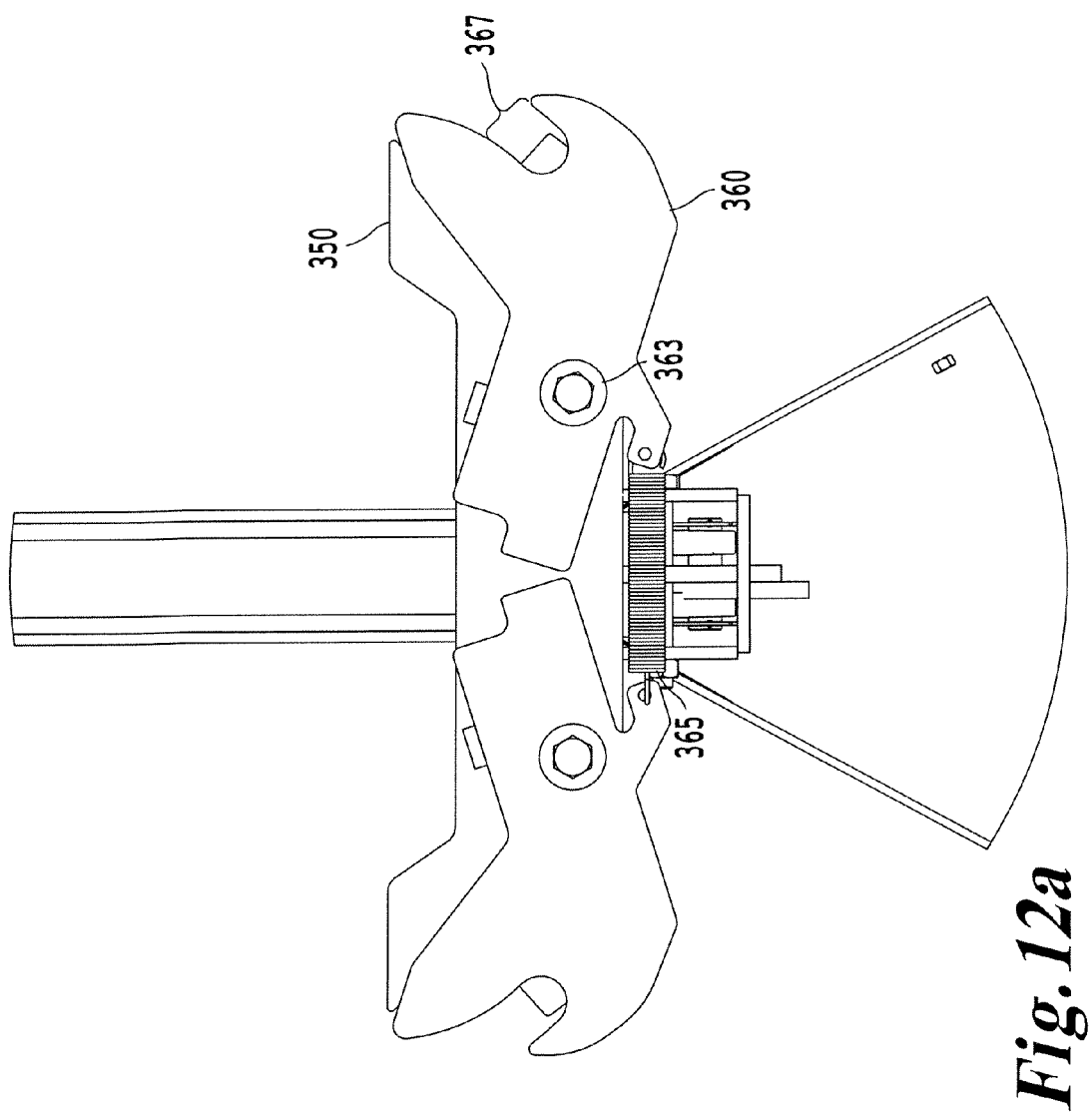
FIG. 12a is a bottom view of the locking device of FIG. 8 in the open position.

FIG. 9a is a top view of an example of the first and second dogs 350 and 360 in the open position (operating position). FIG. 12a is a bottom view of an example of the first and second dogs in the open position. In FIGS. 9a and 12a, the rake apparatus 10' is in the operating position, and therefore, the front rake arm positioner 40 is positioned away from the tongue assembly 20, and the latchable member 341 is not visible in FIGS. 9a and 12a.

Figure 12B:
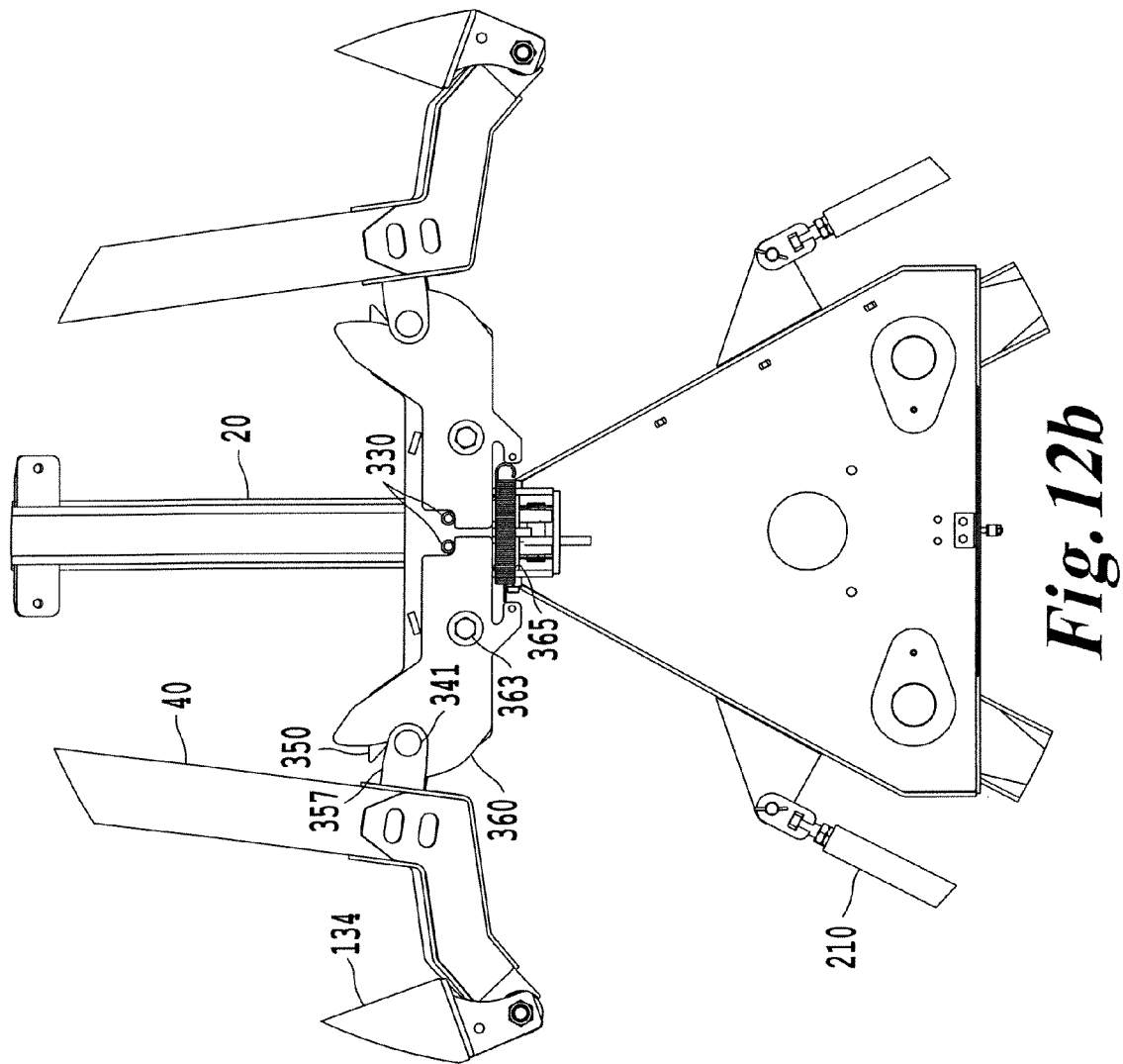
FIG. 12b a bottom view of the locking device of FIG. 9b in the closed position.

FIG. 9b is a top view of an example of the first and second dogs 350 and 360 in the closed position. FIG. 12b is a bottom view of an example of the first and second dogs 350 and 360 in the closed position. In FIGS. 9b and 12b, the rake apparatus 10' is in the transport position, i.e., the front rake arm positioner 40 has moved along an arc, in response to movement of the sled cylinder 90, such that the latchable member 341 has entered both of the dog openings 357 and 367. In the embodiment shown in FIGS. 9b and 12b, only the second dog 360 is movable relative to the tongue assembly 20. In the position shown in FIGS. 9b and 12b, the second dog 360 has moved relative to the first dog 350 in response to pressure from the latchable member 341, and the latchable member 341 cannot leave the first and second dog openings 357 and 367 without further movement of one of the dogs 350 and 360. In other words, the second dog 360 has moved to "grab" or capture the latchable member 341.

In one example, one or both of the dogs 350 and 360 pivot in order to capture the latchable member 341. In another example, one or both of the dogs 350 and 360 slide (or slide and pivot) to capture the latchable member 341. FIGS. 12a and 12b show a dog pivot 363 about which the second dog 360 pivots. Also shown in FIGS. 12a and 12b is a spring which acts as a dog biasing member 365. It is preferable that the dogs 350 and 360 remain in the open position when the latchable member 341 is absent so that the latchable member 341 will be able to easily enter the first and second dog openings 357 and 367 when the rake apparatus 10' converts from the operating mode (similar to rake apparatus 10 as shown in FIG. 7) to the transport mode (similar to the rake apparatus 10 shown in FIG. 6).

It is beneficial to shape the dogs 350 and 360 so that the latchable member 341 will push against one or more surfaces of the first and second dog openings 357 and 367 to move one of the dogs into the closed position to capture the latchable member 341. Thus, the shape of the dog openings 357 and 367 causes the latchable member 341 to close one or both of the dog openings through which it passes.

Figure 10:
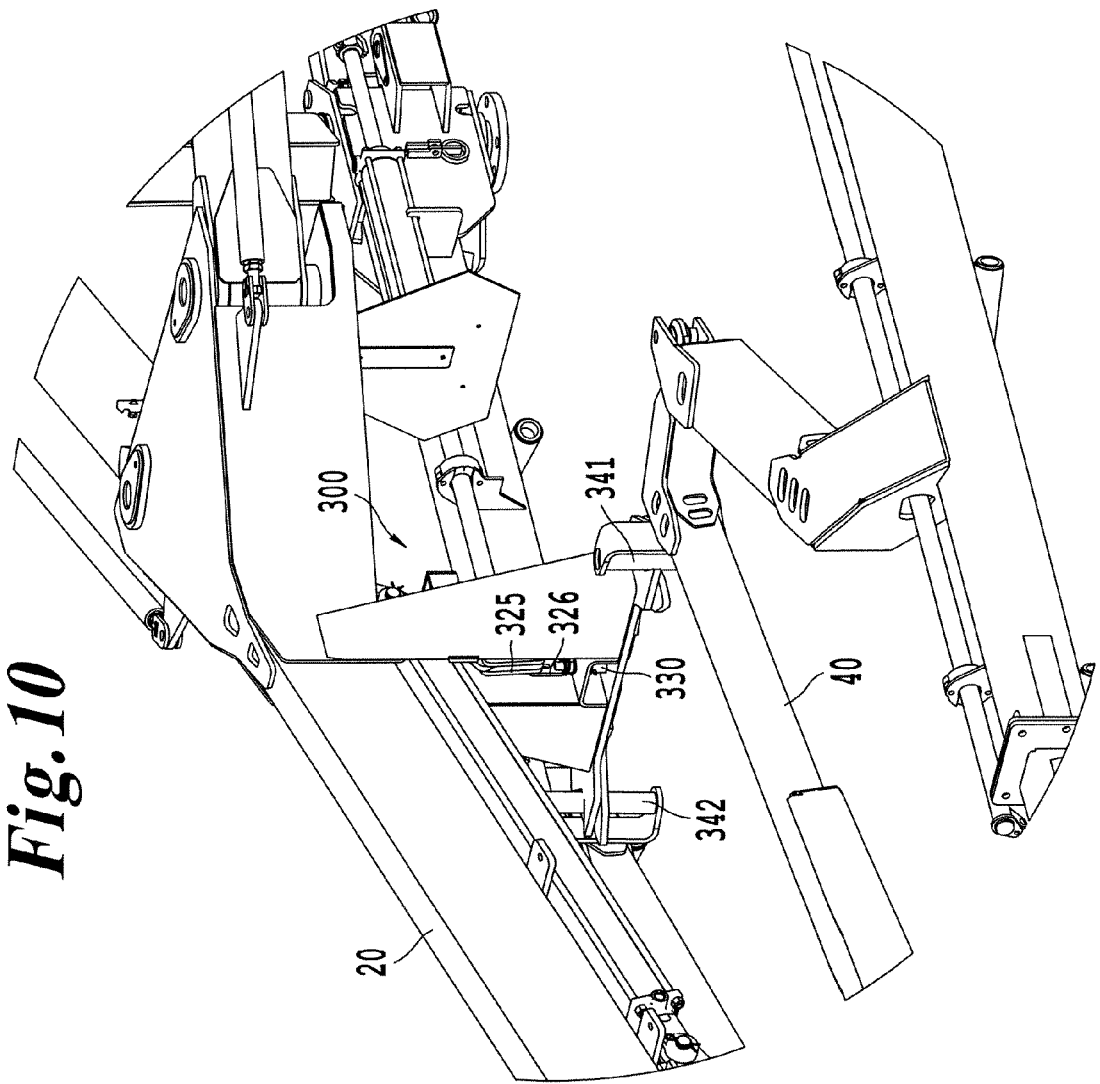
FIG. 10 is a perspective view of the device shown in FIG. 9b with the rake in the transport position.

As shown in FIG. 10, one or more locking members 330 are connected via a mechanism to the sled cylinder 90. Once the dog openings 357 and 367 are closed, the sled cylinder 90 triggers movement of the locking members 330 to lock the second dog 360 relative to the first dog as shown in FIG. 10b.

FIG. 10a is a perspective view showing the locking assembly 300 in the open position. As shown in FIG. 10a, the locking members 330 are retracted from the locked position and disposed away from the first and second dogs 350 and 360 such that the first and second dogs 350 and 360 can move relative to each other (or one dog can move relative to the other).

Figure 10B:
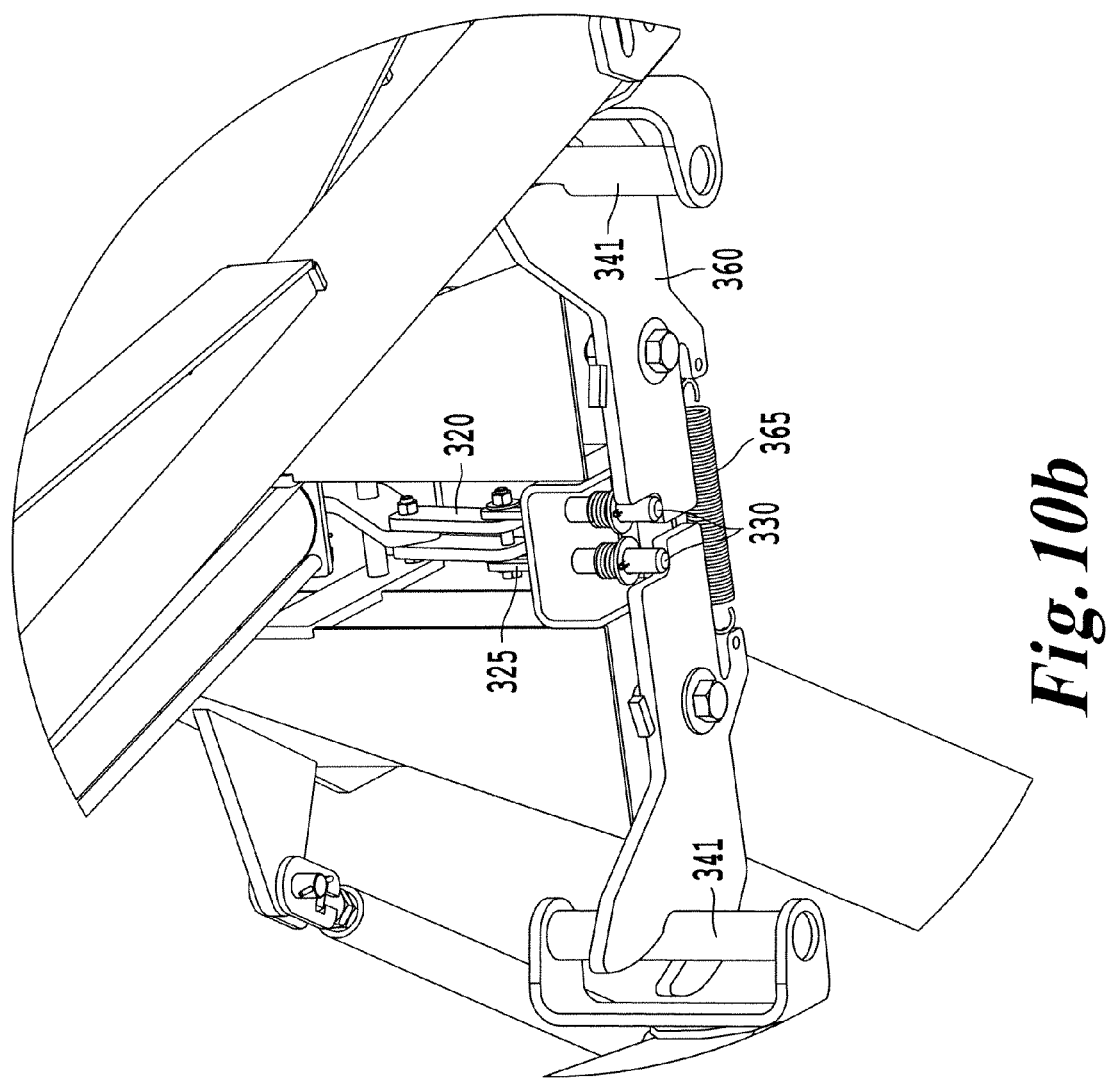
FIG. 10b is a perspective view of the device shown in FIG. 10 in the closed position.

FIG. 10b is a perspective view showing the locking assembly 300 in the closed position. In this position, the rake arm positions have been moved inward by the sled cylinder 90 and sled assembly 80. As shown in FIG. 10b, the locking members have extended into the locked position such that the second dog 360 cannot move relative to the first dog 350. It should be noted that FIG. 10b shows the locking members 330 moved into a locked position by moving downward relative to an unlocked position as shown in FIG. 10a. This is preferable in order to allow gravity to bias the locking members 330 in a locked position. However, the locking members may also be configured to move upward when changing from an unlocked position to a locked position.

Figure 11A:
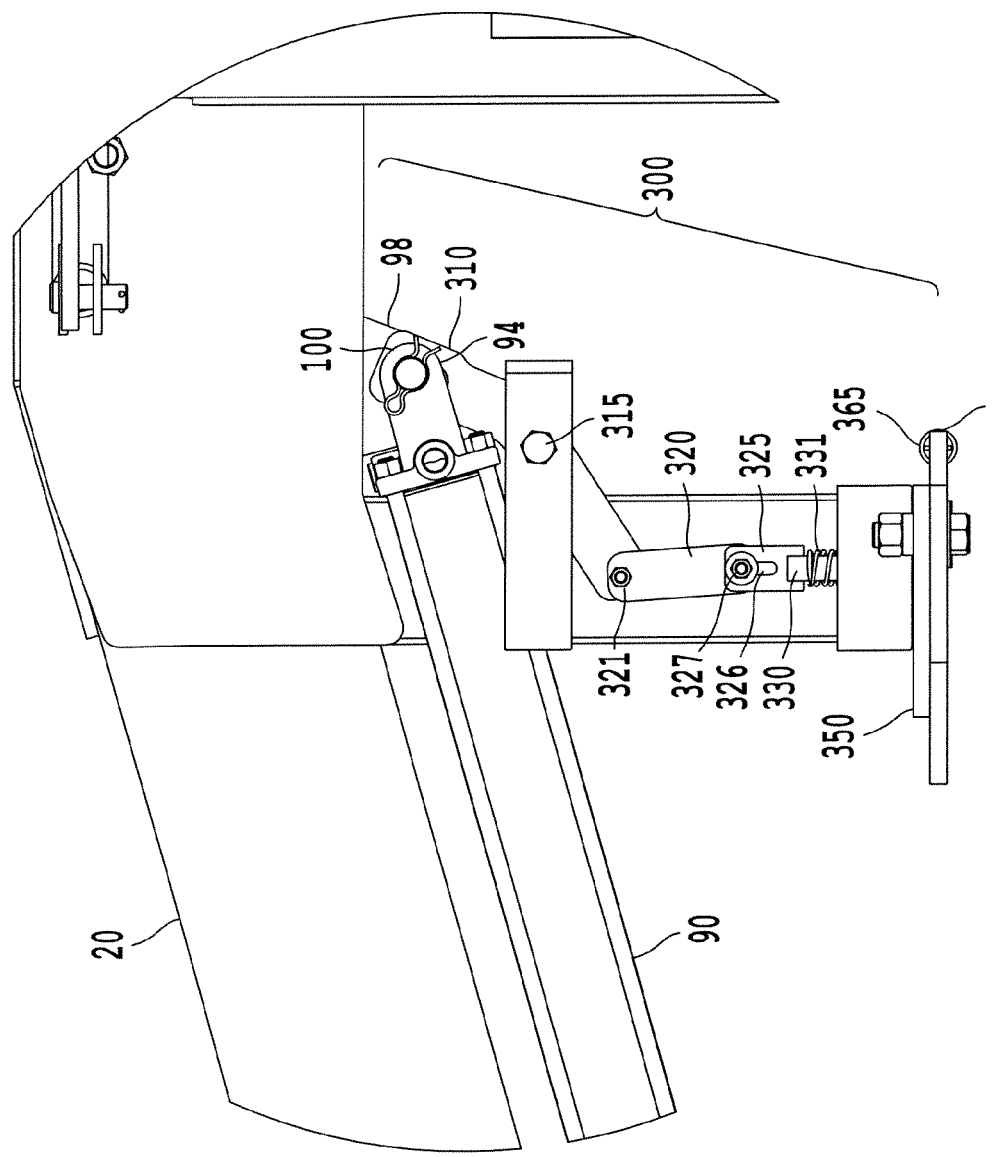
FIG. 11a is a side view of the rake and locking device shown in FIG. 8 with the rake in an open position.
Figure 11B:
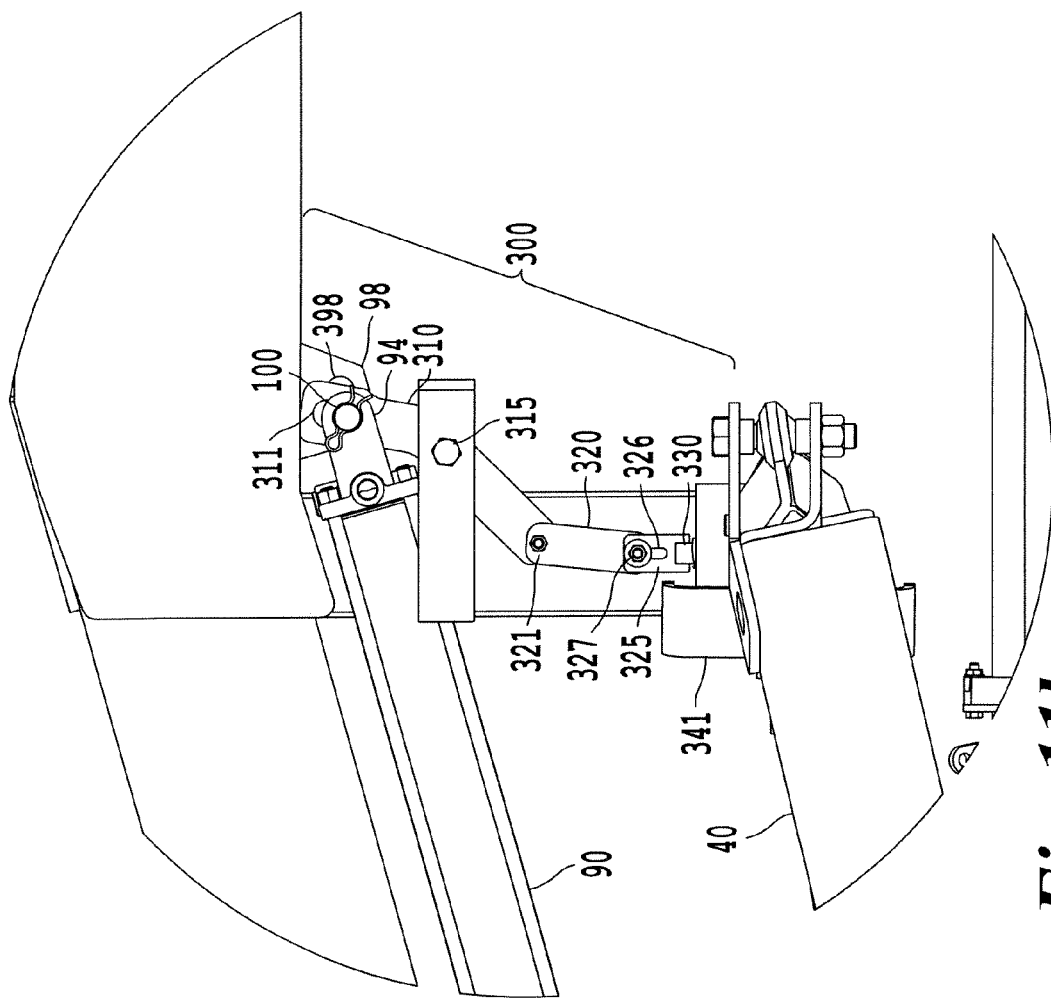
FIG. 11b is a side view of the rake and locking device shown in FIG. 11a, but with the rake in the closed position.
Figure 11C:
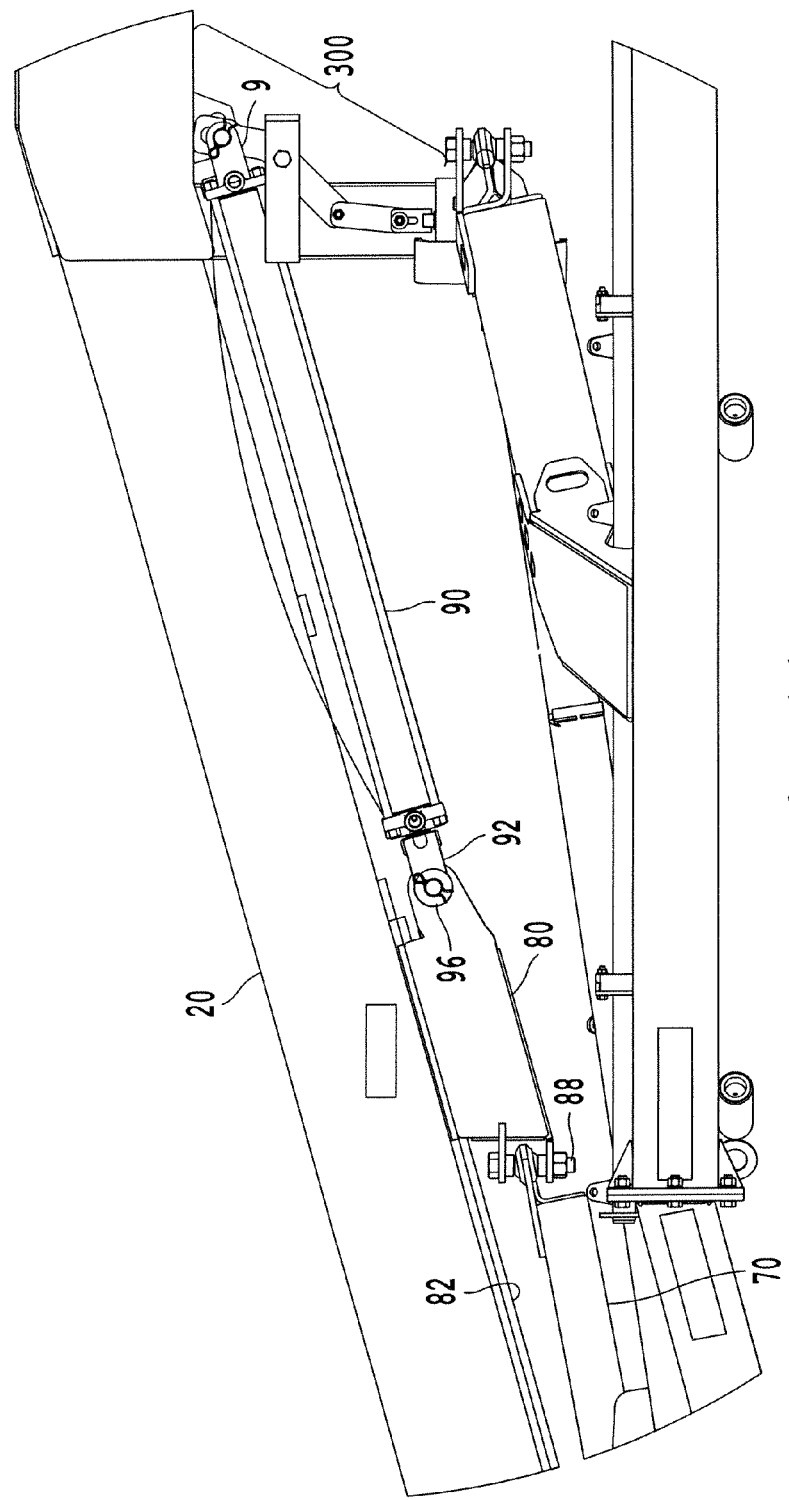
FIG. 11c is a side view similar to that of FIG. 11b, but showing more of the rake, including the sled.

FIGS. 11a and 11b are side views of an example of a mechanism used to lock the locking assembly 300 so that the locking members 330 will stay in place even if the sled cylinder 90 fails after the latchable member is captured within the dog openings 357 and 367. As long as the locking members 330 are in the locking position, the dogs 350 and 360 cannot move to the open position. Therefore, the latchable member 341 will remain captured within the dog openings 357 and 367 despite failure of the sled cylinder 90.

FIG. 11a shows a connection between the sled cylinder 90 and a first linkage 310 within the locking assembly 300 in the open position. The tongue cylinder mount 98 is typically rigidly connected to the tongue assembly 20 and includes an opening 398 through which the rear cylinder pin 100 passes. The rear cylinder pin 100 also passes through a first slot 311 (shown in FIG. 11b), which is disposed in the first linkage 310. Thus, the first linkage 310 and tongue cylinder mount 98 are connected to each other by the rear cylinder pin 100. It is preferable to allow the cylinder pin 100 to move relative to the tongue cylinder mount 98. Thus, the opening 398 is typically large enough to allow the rear cylinder pin to move freely for a short distance without applying pressure to the tongue assembly 20 or sled assembly 80. This free space in the opening 398 allows the sled cylinder 90 to move the first linkage 310 without moving the sled assembly 80. In this arrangement, part of the stroke of the sled cylinder 90 can be used to move the linkage 310 independently of movement of the sled assembly 80, and therefore, independently of movement of the front rake arm positioners 40 and 60. As the locking members 330 are mechanically connected to the first linkage 310, the independent movement of the first linkage 310 allows the locking members 330 to be moved from a locking position to an unlocked position before the pivotable beam or latchable member 341 are moved. Likewise, after movement of the latchable member 341 into the dogs 350 and 360, part of the stroke of the sled cylinder 90 is used to move the locking members into a locked position. Therefore, the dogs 350 and 360 can be locked or unlocked based on movement of the sled cylinder 90 without worry of damage to the dogs 350 and 360 by the latchable member 341. This is so even though the sled cylinder is also used to move the front rake arm positioners 40 and 60. Accordingly, an operator can mechanically lock or unlock the dogs 350 and 360 (and associated pivotable beam(s) such as front rake arm positioners 40 and 60) by actuating a single input such as a switch connected to the sled cylinder 90.

As the first linkage 310 moves in response to movement of the sled cylinder 90, the first linkage 310 pivots about first pivot point 315. The first linkage 310 is coupled with a second linkage 320 by second pivot point 321. Thus, movement of the sled cylinder 90 results in movement of the second linkage 320.

The second linkage 320 is coupled to a third linkage 325, which is in turn coupled to one or more locking members 330. The second linkage 320 is typically coupled to the third linkage via a pin 327 inserted through a final slot 326 disposed in the third linkage 325. As discussed above, the components on each side of the tongue assembly are typically symmetrical. Accordingly, the above-noted third linkage 325 and final slot 326 are duplicated on the opposite side of the tongue assembly 20. The locking member 330 moves into and out of a locking position based on being coupled to the sled cylinder 90 by the various linkages 310, 320, and 325.

As discussed above, the components on each side of the tongue assembly are typically symmetrical. Thus, the above-noted third linkage 325, final slot 326, and locking member 330 are typically duplicated on the opposite side of the tongue assembly 20. In one example, the final slot 326 allows movement of a locking member 330 on one side of the tongue assembly 20, for example, the right side as shown in FIG. 8, while the locking member 330 on the opposite side does not move.

When in the locked position as shown in FIG. 12b, the locking member 330 prevents movement of the dogs 350 and 360 from the closed position to the open position. Thus, as explained above, the first linkage 310 can move, in response to movement of the sled cylinder 90 and sled assembly 80, independently of the rake arm positioners 40 and 60. Accordingly, the locking members 330 can be moved into and out of the locked position independently of the movement of the rake arm positioners 40 and 60.

Figure 13B:
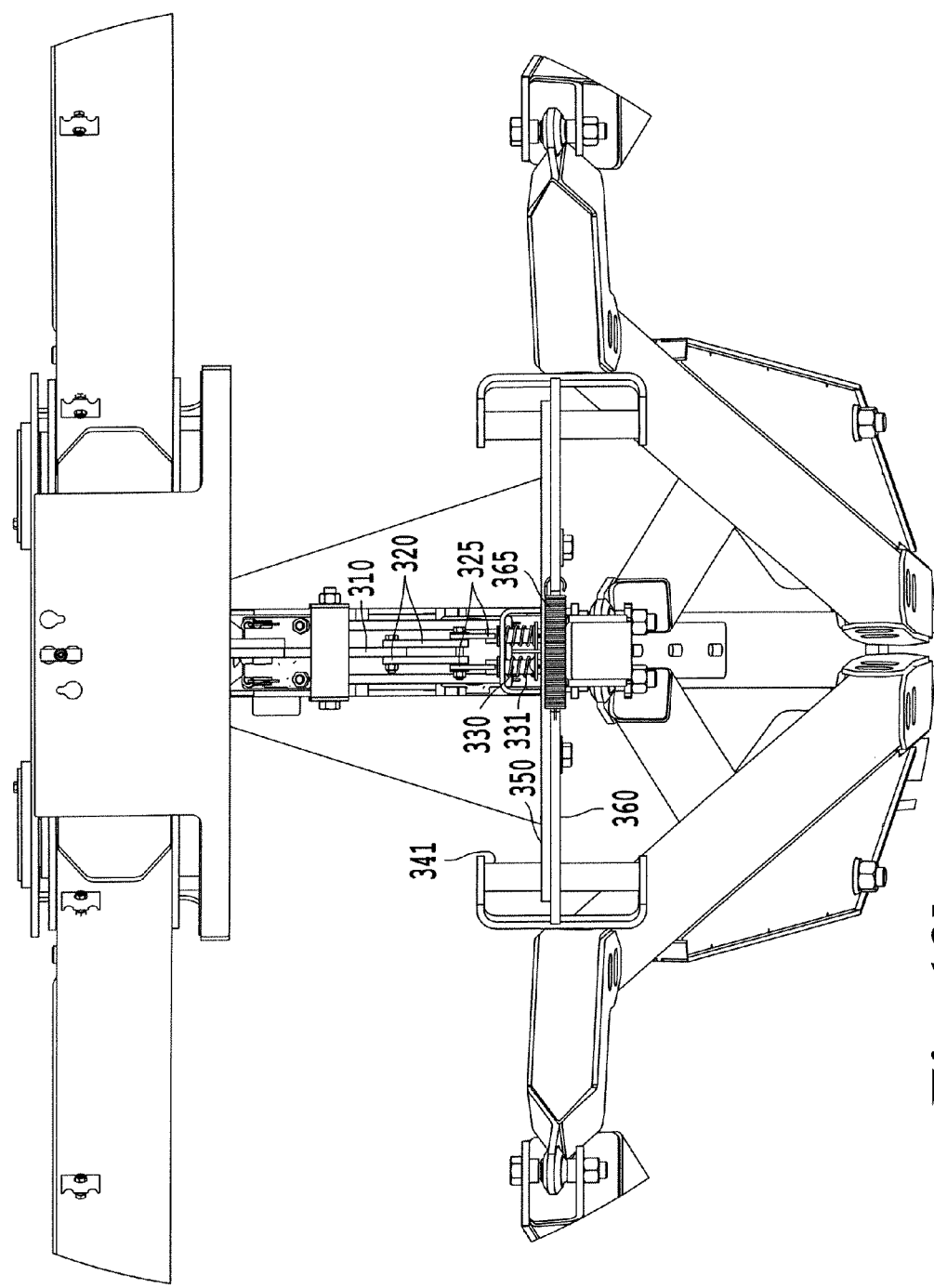
FIG. 13b is a rear view of a locking device in a closed position.

In FIGS. 12b, 13a, and 13b, the locking members 330 are shown as a pair of round pins that drop into place to prevent movement of the dogs 350 and 360. One pin is positioned on each side of the rake apparatus 10'. However, other shapes and configurations of the locking member 330 are possible. For example, the locking member 330 could be a single component that blocks movement of the dogs 350 and 360 for both sides of the rake apparatus 10'. Such a configuration is typically simpler to manufacture than an arrangement including two separate locking members 330.

One advantage of providing separate locking members 330 is that the locking members may be individually locked. The final slot 326 permits movement of one locking member 330 without movement of another. In this arrangement, if one of the latchable members 341 has not yet caused sufficient movement of dogs 350 and 360 to allow the locking members 330 to move into the locking position, but the other latchable member 341 has, then the locking member 330 associated with the latchable member 341 that has moved sufficiently can lock that latchable member in place. This is so even though the other locking member 330 is not yet able to move into the locking position. If the rake apparatus 10' is on uneven ground, it is possible for one of the pivotable beams to lag behind the other while moving from an operating position to a transport position. For example, if the front rake arm positioner 40 lags behind the front rake arm positioner 60 while moving along the arc 'A', then the latchable member 341 will enter the dog openings 357 and 367 after the latchable member 342 enters the dog openings 357 and 367 associated with its side of the rake apparatus 10'. In this case, it is sometimes beneficial to lock the latchable member 342 in place even though the other latchable member, 341, is not yet fully within the dog openings 357 and 367. The final slot 326 allows sufficient independent movement of each of the separate locking members 330 to permit separate locking of the latchable members 341 and 342. In other words, one side of the rake apparatus 10' can be locked in the transport position when the other side is not locked in the closed position.

When one of the front rake arm positioners 40 and 60 lags behind the other while moving along the arc, one of the separate locking members 330 may lock in place before the other, and the later of the locking members 330 to lock will typically slide along a surface of one of the dogs 350 and 360 until the dog has moved sufficiently for the locking member 330 to fully move into a locked position. One advantageous embodiment of the invention provides a lubricated surface to one or both of the dogs 350 and 360. This lubrication reduces friction between the locking member 330 and the dog as the locking member slides along the surface of the moving dog. Additionally, the locking member 330 can include a chamfered or rounded end to enhance the ability of the locking member 330 to push into a locked position once the moving dog has moved far enough into a closed position to allow locking. Moreover, the chamfered or rounded end of the locking member 330 can reduce friction between the locking member 330 and the dog against which the locking member 330 slides.

FIG. 13a is a rear view of the locking assembly 300 in the open position, i.e., where the latchable member 341 is not yet in place within the dog openings 357 and 367. FIG. 13b is a rear view of the locking assembly in the closed position with the latchable member 341 captured within the dog openings 357 and 367 and the locking member 330 in a locked position. It is preferable for the locking member 330 to be biased in the locked position in order to reduce the risk that the locking member 330 will unlock in the event that the sled cylinder 90 fails. Accordingly, as shown in FIGS. 13a and 13b, a biasing member or locking member spring 331 is provided to push the locking member 330 into the locking position relative to the dogs 350 and 360. While a mechanical spring is shown in FIGS. 13a and 13b, other forms of biasing members such as weights or gas springs are possible.

In transition from the operating (open) position to the transport (closed) position, the front rake arm positioners 40 and 60 typically approach the tongue assembly 20 along a substantially horizontal arc, i.e., within 5° of the plane defined by the wheels 194 and 198. Accordingly, the front rake arm positioners 40 and 60 allow a relatively simple movement for capture of the latchable member 341, and it is preferred to use the front rake arm positioners 40 and 60 as the movable beam that supports the latchable member 341. However, as discussed above, other movable members of the rake apparatus 10' may be used as a pivotable beam. For example, if some portion of the rake arms 130 and 180 (shown in FIG. 8) is configured to approach the tongue assembly 20 in the transport position, then the latchable members 341 and 342 can be directly connected to the rake arms 130 and 180 themselves.

Although the dogs 350 and 360 are shown in the FIGS. 8-13b as movable in the horizontal direction, it is possible to configure the dogs 350 and 360 to move in a vertical direction in order to capture or release the latchable member 341 and 342. Additionally, while it is preferable to position the locking assembly 300 at the rear end of the cylinder 90 in order to avoid interference with the push arms 50 and 70 and to maximize the leverage applied by the dogs 350 and 360 to the latchable member 341, it is not required. Furthermore, the dogs 350 and 360 can be disposed above or below the main portion of the tongue assembly 20.

Although the description above contains many specifics, these should not be construed as limiting the scope of the invention but as merely providing illustrations of some of the presently preferred embodiments of this invention. Thus the scope of the invention should be determined by the appended claims and their legal equivalents, rather than by the examples given. From the foregoing, it can be seen that the present invention accomplishes at least some of the stated objectives.

The invention claimed is:

1. An agricultural apparatus configured to be pulled in a forward direction, comprising:
    a tongue assembly;
    a pivotable beam linked to the tongue assembly and configured to pivot relative to the tongue assembly;
    a cylinder configured to move the pivotable beam from an operating position, in which the apparatus has a first width as measured in a direction perpendicular to the forward direction, to a transport position in which the apparatus has a second width as measured in a direction perpendicular to the forward direction, and the first width is larger than the second width;
    a latchable member connected to the pivotable beam at a location on the pivotable beam that is closer to the tongue assembly when the pivotable beam is in the transport position than when the pivotable beam is in the operating position;
    a first dog connected to the tongue assembly and including a first dog opening configured to receive the latchable member;
    a second dog connected to the tongue assembly and including a second dog opening configured to receive the latchable member, the second dog being configured to move relative to the first dog from an open position to a closed position in response to movement of the latchable member such that movement of the latchable member out of the second dog opening is blocked by the first dog while the second dog is in the closed position; and a locking member configured to move, in response to movement of the cylinder, from an unlocked position to a locked position such that the second dog is locked in the closed position when the locking member is in the locked position.

2. The agricultural apparatus of claim 1, wherein the pivotable beam is a front rake arm positioner connected between the tongue assembly and a rake arm.

3. The agricultural apparatus of claim 2, further comprising a sled connected to the cylinder and configured to move along the direction of travel in response to movement of the cylinder and to cause the front rake arm positioner to pivot relative to the tongue assembly from a transport position to an operating position.

4. The agricultural apparatus according to claim 3, wherein a rake arm assembly is configured to move in response to movement of the cylinder via connection to the cylinder through the front rake arm positioner.

5. The agricultural apparatus of claim 1, wherein the first dog is rigidly connected to the tongue assembly.

6. The agricultural apparatus of claim 5, wherein the second dog moves by pivoting relative to the tongue assembly in response to pressure applied to the second dog by the latchable member.

7. The agricultural apparatus of claim 1, further comprising a biasing member configured to bias the second dog in the open position.

8. The agricultural apparatus of claim 1, wherein movement of the cylinder moves the locking member from the locked position to the unlocked position before moving the pivotable beam from the transport position to the operating position.

9. The agricultural apparatus of claim 1, wherein the pivotable beam is configured to pivot along a substantially horizontal arc.

10. The agricultural apparatus of claim 1, wherein the locking member is configured to slide along a surface of the second dog during movement of the second dog from the open position to the closed position.

11. A rake apparatus configured to be pulled in a forward direction, comprising:
    a tongue assembly;
    a pivotable beam connected to the tongue assembly and configured to pivot relative to the tongue assembly;
    a cylinder configured to move the pivotable beam from an operating position, in which the apparatus has a first width as measured in a direction perpendicular to the forward direction, to a transport position in which the apparatus has a second width as measured in a direction perpendicular to the forward direction, and the first width is larger than the second width;
    a latchable member connected to the pivotable beam at a location on the pivotable beam that is closer to the tongue assembly when the pivotable beam is in the transport position than when the pivotable beam is in the operating position;
    a first dog connected to the tongue assembly;
    a second dog connected to the tongue assembly and including a second dog opening configured to receive the latchable member, the second dog being configured to move relative to the first dog from an open position to a closed position in response to movement of the latchable member such that movement of the latchable member out of the second dog opening is blocked by the first dog while the second dog is in the closed position; and a locking member configured to move, in response to movement of the cylinder, from an unlocked position to a locked position such that the second dog is locked in the closed position when the locking member is in the locked position.

12. The rake apparatus of claim 11, wherein the pivotable beam is a front rake arm positioner connected between the tongue assembly and a rake arm.

13. The rake apparatus of claim 12, further comprising a sled connected to the cylinder and configured to move along the direction of travel in response to movement of the cylinder and to cause the front rake arm positioner to pivot relative to the tongue assembly from a transport position to an operating position.

14. The rake apparatus according to claim 13, wherein a rake arm assembly is configured to move in response to movement of the cylinder via connection to the cylinder through the front rake arm positioner.

15. The rake apparatus of claim 11, wherein the first dog is rigidly connected to the tongue assembly.

16. The rake apparatus of claim 15, wherein the second dog moves by pivoting relative to the tongue assembly in response to pressure applied to the second dog by the latchable member.

17. The rake apparatus of claim 11 further comprising a biasing member configured to bias the second dog in the open position.

18. The rake apparatus of claim 11, wherein movement of the cylinder moves the locking member from the locked position to the unlocked position before moving the pivotable beam.

19. The rake apparatus of claim 11, wherein the pivotable beam is configured to pivot along a substantially horizontal arc.

20. The agricultural apparatus of claim 11, wherein the locking member is configured to slide along a surface of the second dog during movement of the second dog from the open position to the closed position.

21. A rake apparatus configured to be pulled in a forward direction, comprising:
    a tongue assembly;
    a pivotable beam connected to the tongue assembly and configured to pivot relative to the tongue assembly;
    a cylinder configured to move the pivotable beam from an operating position, in which the apparatus has a first width as measured in a direction perpendicular to the forward direction, to a transport position in which the apparatus has a second width as measured in a direction perpendicular to the forward direction, and the first width is larger than the second width;
    a latchable member connected to the pivotable beam at a location on the pivotable beam that is closer to the tongue assembly when the pivotable beam is in the transport position than when the pivotable beam is in the operating position;
    a first dog connected to the tongue assembly;
    a second dog connected to the tongue assembly and including a second dog opening configured to receive the latchable member, the second dog being configured to move relative to the first dog from an open position to a closed position in response to movement of the latchable member such that movement of the latchable member out of the second dog opening is blocked by the first dog while the second dog is in the closed position; and means for locking the latchable member in the second dog opening in response to movement of the cylinder independently of movement of the pivotable beam.

22. A method of locking a rake apparatus in a transport position, which transport position is narrower than an operating position, comprising:

providing a tongue assembly;

moving a cylinder to pivot a pivotable beam relative to the tongue assembly such that an overall width of the rake apparatus is narrower as measured in a direction perpendicular to the direction of travel than when the rake apparatus is in an operating position;

capturing, via a dog connected to the tongue assembly, a latchable member connected to the pivotable beam;

locking the dog in a closed position, which holds the latchable member, via a locking member, in response to movement of the cylinder.

* * * * *